(12) United States Patent
Woodgate et al.

(10) Patent No.: US 6,583,938 B1
(45) Date of Patent: Jun. 24, 2003

(54) OPTICAL DEVICE AND PROJECTION DISPLAY

(75) Inventors: Graham John Woodgate, Oxfordshire (GB); Duncan James Anderson, Tarrytown, NY (US); Jason Slack, Oxford (GB); Marina Vladimirovna Khazova, Oxfordshire (GB)

(73) Assignee: Sharp Kabushiki Kaisha, Osaka (JP)

(*) Notice: Subject to any disclaimer, the term of this patent is extended or adjusted under 35 U.S.C. 154(b) by 71 days.

(21) Appl. No.: 09/675,793

(22) Filed: Sep. 29, 2000

(30) Foreign Application Priority Data

Oct. 2, 1999 (GB) .............................. 9923215

(51) Int. Cl.[7] .......................... G02B 27/10; G02B 27/14
(52) U.S. Cl. ...................................... 359/625; 359/627
(58) Field of Search ............................... 359/625, 619, 359/487, 620, 621, 624, 626, 495, 337, 41, 627, 290, 292, 296; 349/5, 95, 146, 64; 385/115

(56) References Cited

U.S. PATENT DOCUMENTS

| | | | | |
|---|---|---|---|---|
| 4,486,070 A | * | 12/1984 | Benton | 359/32 |
| 5,583,669 A | * | 12/1996 | Fushimi et al. | 349/5 |
| 5,623,349 A | * | 4/1997 | Clarke | 345/32 |
| 5,710,671 A | * | 1/1998 | Bichlmaier | 359/537 |
| 5,731,857 A | | 3/1998 | Neijzen | 349/95 |
| 5,757,341 A | * | 5/1998 | Clarke et al. | 345/32 |
| 5,825,443 A | | 10/1998 | Kawasaki et al. | 349/95 |

FOREIGN PATENT DOCUMENTS

| | | |
|---|---|---|
| EP | 0 953 865 A2 | 3/1999 |
| JP | 3-175429 | 7/1991 |
| JP | 3-278026 | 12/1991 |
| JP | 9-15626 | 1/1997 |

OTHER PUBLICATIONS

European Search Report, Application No. EP 00 30 8560, dated Feb. 15, 2001.

* cited by examiner

*Primary Examiner*—Georgia Epps
*Assistant Examiner*—Omar Hindi
(74) *Attorney, Agent, or Firm*—Renner, Otto, Boisselle & Sklar

(57) ABSTRACT

An optical device which is suitable for use in a projection display comprises a spatial light modulator, such as a liquid crystal device, with a microlens array disposed on its front surface. The microlenses are of convergent type, such as lenticules. The spatial light modulator is of the reflective type and comprises a plurality of rear reflectors, each of which has convergent optical power in at least one direction. The reflectors are arranged such that, for a given direction of illumination, each reflector forms an image of the aperture A of a microlens on the aperture B of another microlens or at a different position on the same microlens. When used in, for example, a projection display, light losses caused by vignetting are reduced.

37 Claims, 32 Drawing Sheets

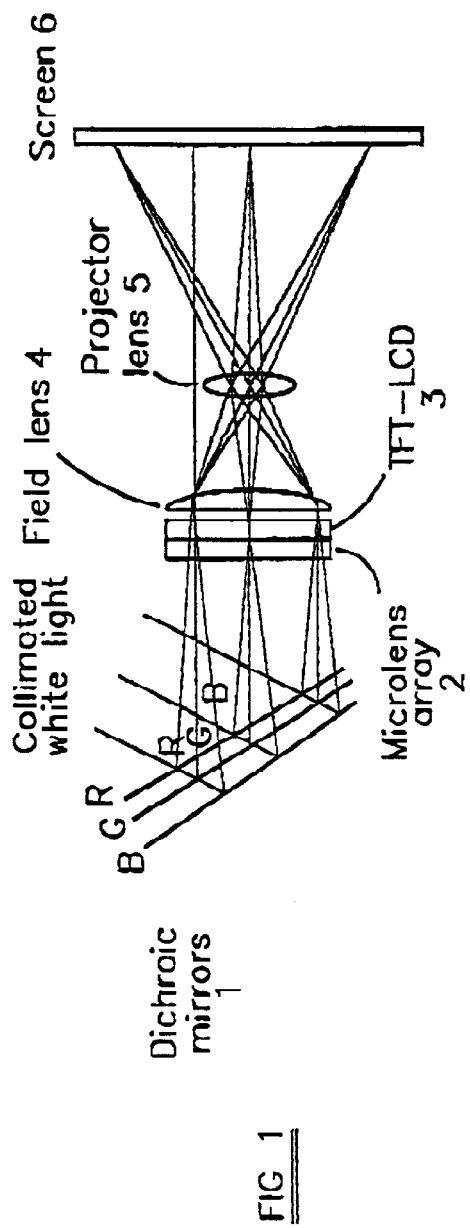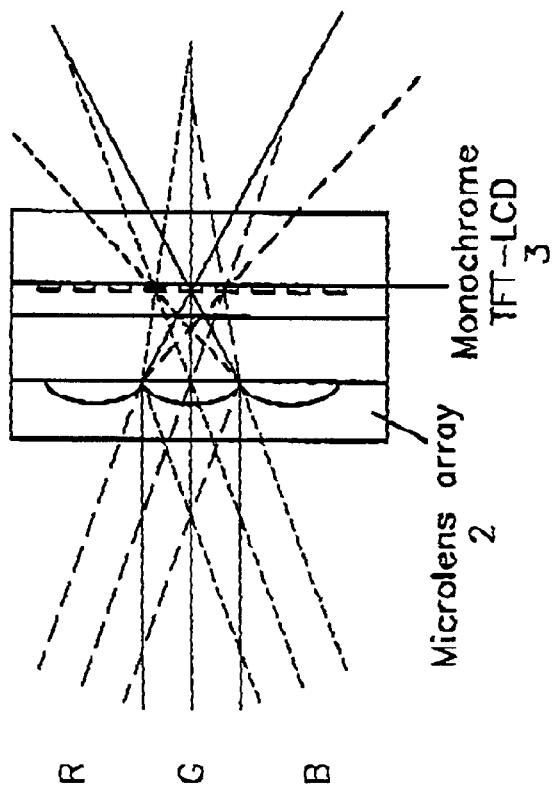
FIG 1
FIG 2

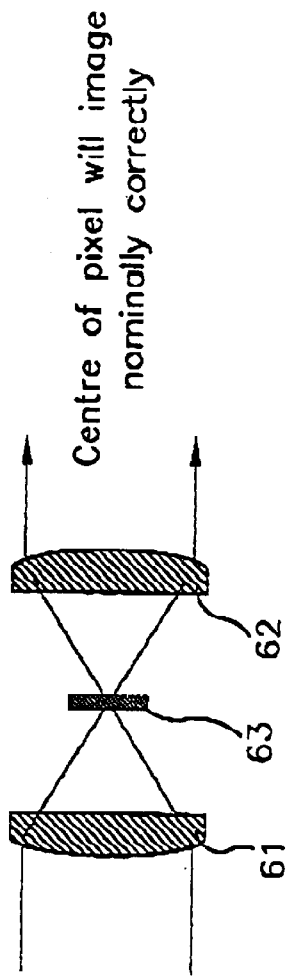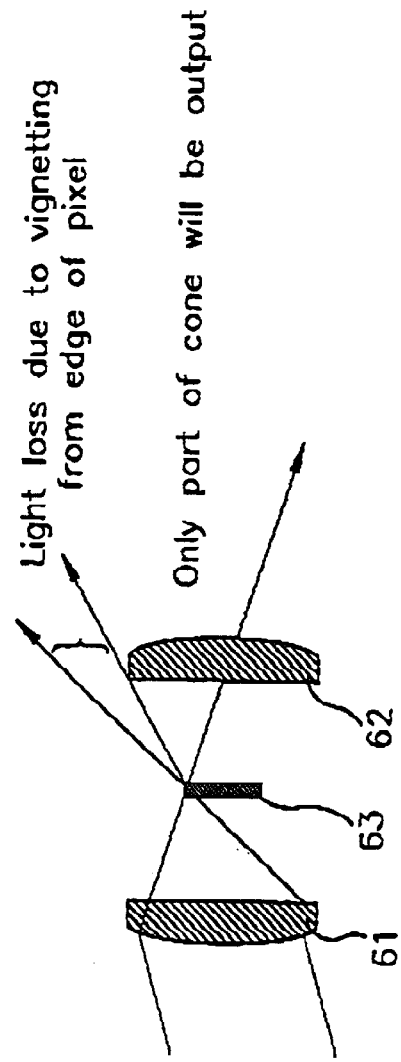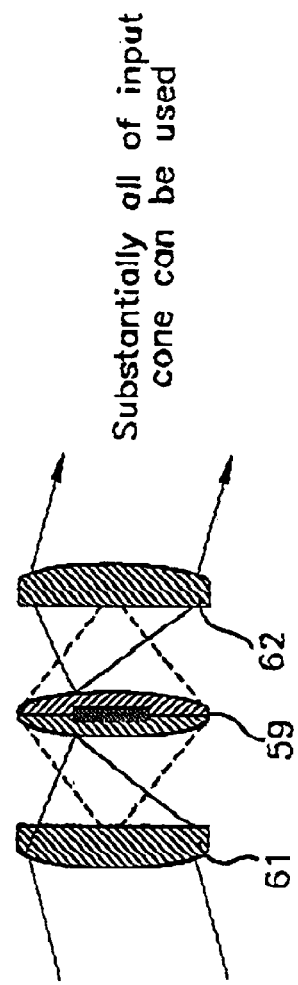

Light loss due to vignetting from edge of pixel still happens for rays at edge of pupil Only part of output cone is useful

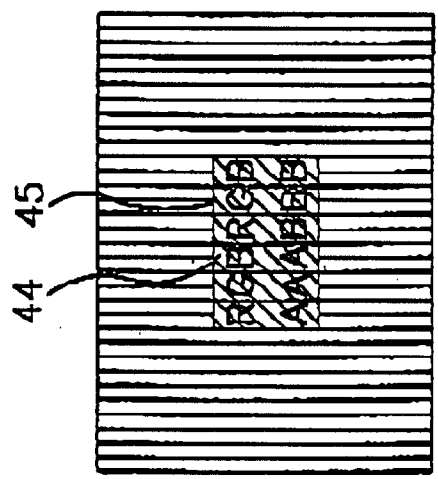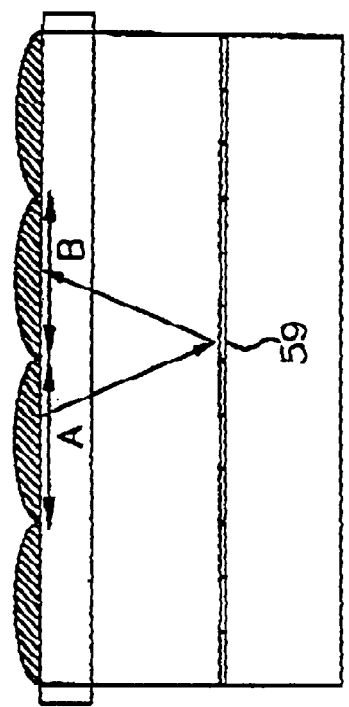
FIG 16

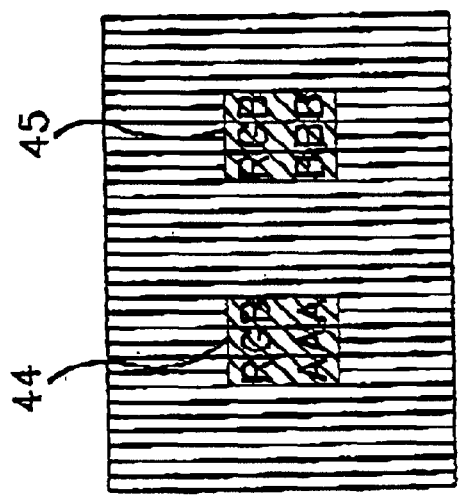
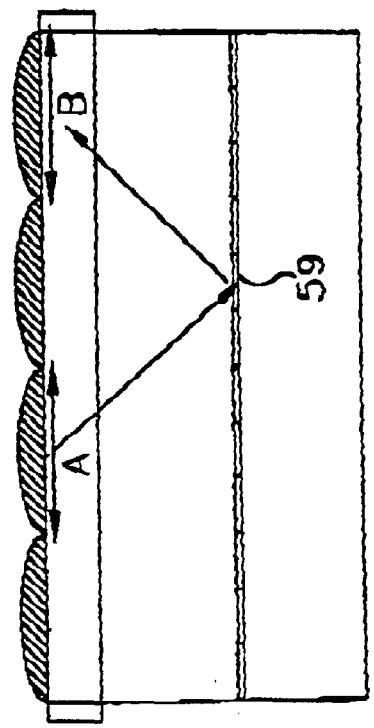
FIG 17

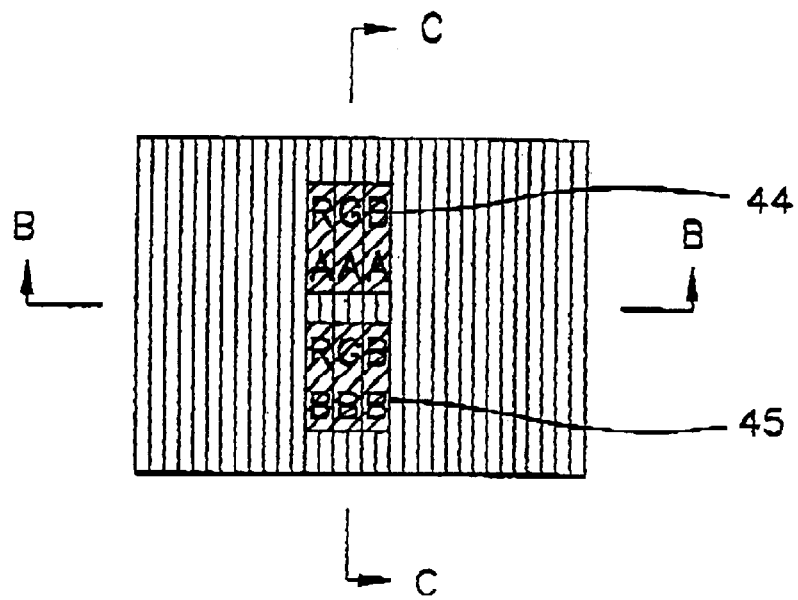
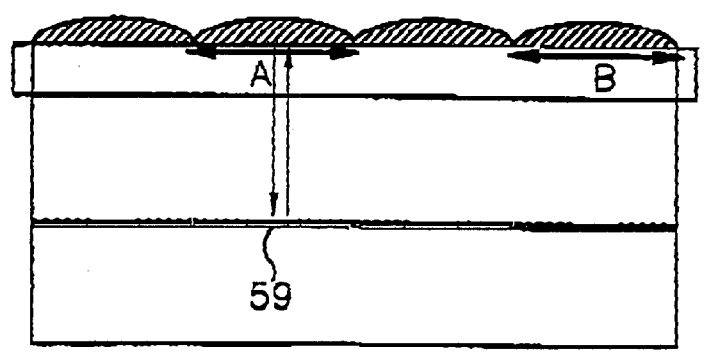
FIG 18ᵃ
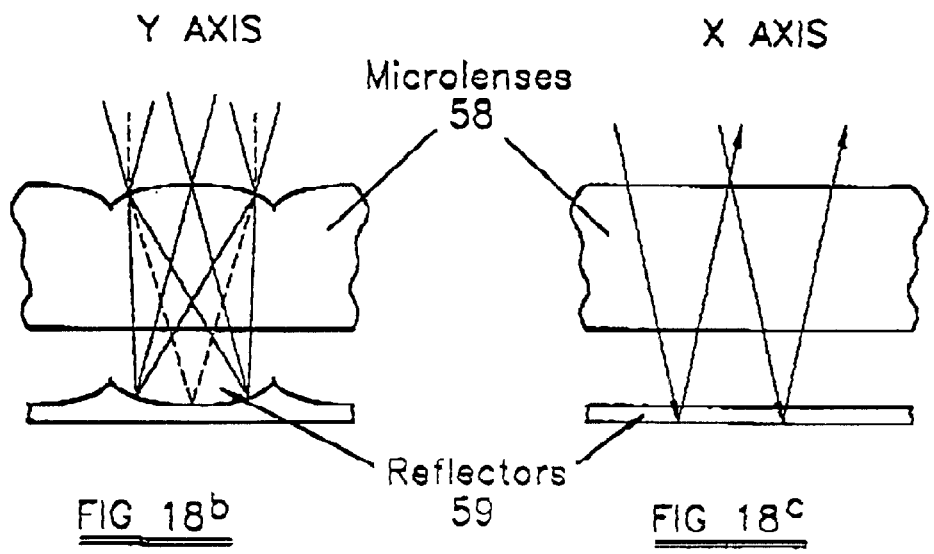
FIG 18ᵇ  FIG 18ᶜ

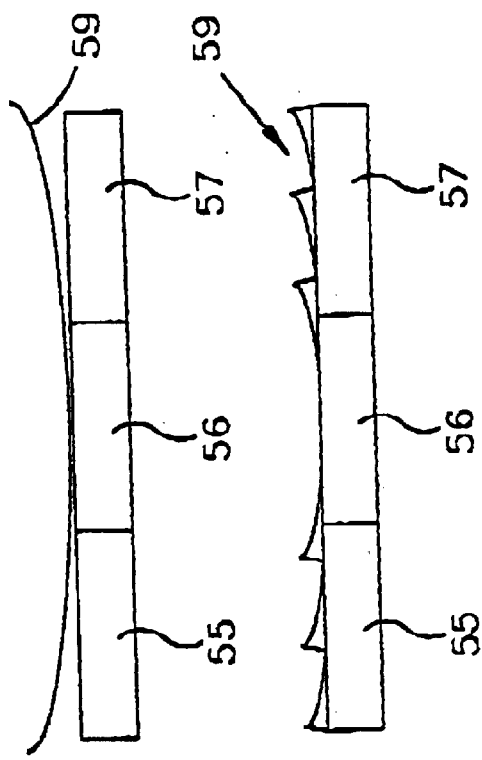
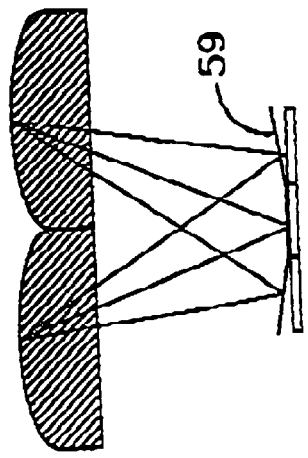
FIG 21
Reflective mirror covers 3 pixels
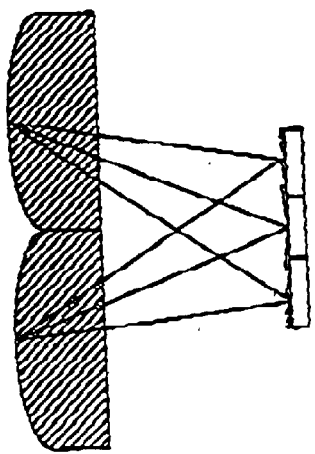
FIG 22
3 Blazed reflectors

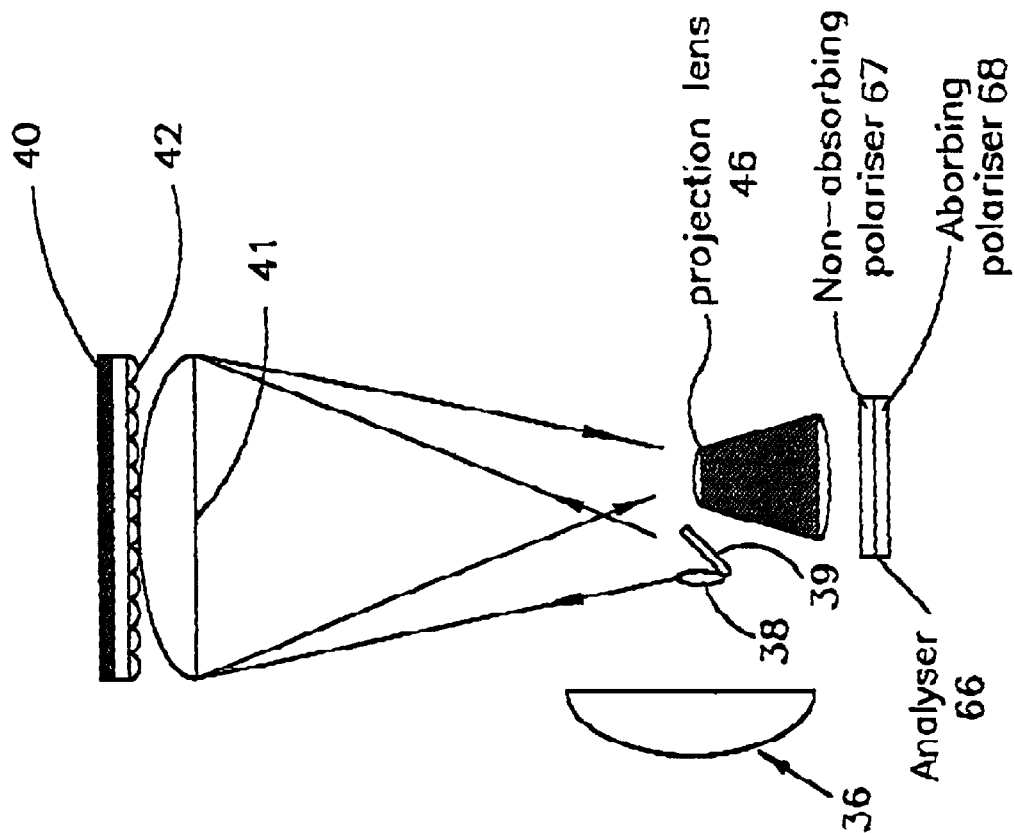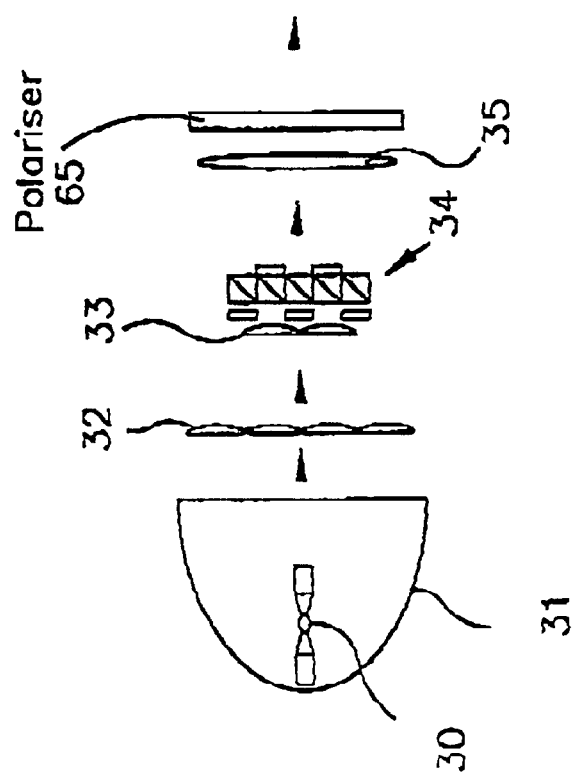
FIG 24 ic device and to projection display is of the same type as that# OPTICAL DEVICE AND PROJECTION DISPLAY

BACKGROUND OF THE INVENTION

1. Field of the Invention

The present invention relates to an optical device and to a projection display incorporating such an optical device.

2. Description of the Related Art

GB 9 811 782.3 discloses a projection display in which a transmissive spatial light modulator (SLM) in the form of a liquid crystal device (LCD) is illuminated by an illumination source. The display is of the single panel type and includes a holographic field element and a projection optical system. Each picture element (pixel) of the SLM is associated with a holographic field element reflector which reflects light from the source to the entrance aperture or pupil of a projection lens. The field function of the display is thus incorporated in the holographic reflectors. The holographic reflectors may be patterned in order to generate a spatially multiplexed image without the use of absorptive colour filters.

This arrangement has the inconvenience that either the holographic field element reflector in the form of a volume hologram must be incorporated immediately adjacent the liquid crystal layer which involves manufacturing difficulties, or the holographic reflectors may be incorporated inside the counter substrate of the SLM, which reduces the aperture ration and hence the display brightness.

FIGS. 1 and 2 of the accompanying drawings illustrate a known type of single panel projection display as disclosed in H. Hamada et al, IDRC, 1994, pp 442–423 "A new bright single panel LC-projection system without a mosaic colour filter" and in U.S. Pat. No. 5,164,102. An illumination source (not shown) directs collimated white light to a set of relatively titled dichroic mirrors 1 for reflecting red, green and blue light with a relative angular separation. The resulting colour component beams are directed to a microlens array 2 disposed on the surface of a monochrome thin film transistor (TFT) LCD 3. Each microlens of the array 2 is disposed above three pixels and focuses the red, green and blue light beams onto the apertures of respective ones of the three pixels. The LCD 3 is of the transmissive type and the modulated light therefrom passes through a field lens 4 and a projection lens 5 such that the image is projected onto a screen 6.

The size of the image of the light source produced at each pixel is determined by the system etendue, the pitch of the LCD pixels and the thickness of the glass substrate. Etendue is a term representing brightness at any point in a system and is defined as the product of the beam area and solid angle of the beam divergence. For efficient coupling of optical radiation through a projection system, the etendue should be matched at each point through the system. Etendue mismatch causes a loss of brightness. In this transmission panel system, the light must be focused into the relatively small aperture of the pixel. Thus, the solid angle of the optical beam will be required to increase to compensate in order to maintain brightness. If the glass substrate is too thick then such a solid angle cannot be achieved by the microlenses and light is lost around the edge of the pixel. Also, green light may spill from the aperture of the green pixel into the red pixel and so on.

This type of arrangement works well for large low resolution LCD panels. However, if it is required to provide a higher resolution display for a given size of LCD panel, smaller pixel sizes must be provided and it may not be possible to illuminate such smaller pixels accurately with the available etendue. Alternatively, a larger panel may be used but this results in an increase in the bulk of the system.

C. Joubert et al, "Dispersive holographic microlens matrix for single LCD projection", SPIE vol 2650 pp 243–249 discloses a projection display as illustrated in FIG. 3 of the accompanying drawings. An arc lamp 7 and parabolic reflector 8 supply collimated white light to a phase volume holograph 9 which separates the illuminating white light into red, green and blue beams with a small angular separation between each adjacent pair of beams. A cylindrical microlens array 10 focuses the R,G,B beams into the apertures of pixels in an LCD 11. This display is of the same type as that disclosed in Hamada but with the dichroic filters replaced by the hologram 9. Accordingly, this display suffers from the same problems associated with beam etendue, panel size and glass thickness.

JP 9 015 626 A discloses a reflection mode projection display as shown in FIG. 4 of the accompanying drawings. An LCD 12 is provided with a microlens array 13 having microlenses formed on its upper and lower surfaces. The LCD 12 comprises composite pixels, each of which is aligned with a respective microlens 14 formed on the front surface of the array 13. Each composite pixel comprises individual sub-pixels 15,16 and 17 aligned with respective microlenses such as 18 on the lower surface of the array 13. The sub-pixels 15,16 and 18 modulate red, green and blue light respectively, so as to provide a single panel colour display.

The LCD 12 incorporates plane reflectors, each of which forms part of a respective colour component sub-pixel. The green reflector 19 is disposed in the plane of the LCD 12 whereas the red and blue reflectors 20 and 21 are tilted in opposite directions.

Incident collimated colour component light beams are shown at 22B,22G and 22R. Each of the light beams is focused by the microlens array 13 to the aperture the corresponding sub-pixel and onto the corresponding reflector 19 to 21. The reflectors 19 to 21 have no optical power and reflect the colour component light beams substantially back along the incident light paths. Thus, light is reflected back through the same microlenses so that the input and output pupils are at the same location. It is therefore necessary to provide a beam splitter in the optical system so that the output light from the LCD 12 for projection can be separated from the path of the input light from the illumination system. This results in increased bulk and weight together with light and contrast losses. Also, as described hereinafter, vignetting occurs and this results in further light losses.

JP 10221681 also discloses the use of a microlens array on the front surface of a reflective LCD. Each colour component sub-pixel of he LCD has a plane reflector which gives rise to vignetting and loss of light. Also, the microlens array is of the two dimensional type and further loss occurs because of lens edge effects and the reduced aperture ratio of lenses. However, separate input and output pupils are provided so that a beam splitter is not required.

U.S. Pat. No. 5,825,443 discloses an arrangement which is similar to that disclosed in JP10221681 and which therefore suffers from the same disadvantages.

EP 0 953 865 discloses a projection display which includes an optical modulator comprising an LCD of reflective type and two microlens arrays. This microlens arrays are aligned with each other and have a pitch which is three times the pitch of the individual colour component pixels of the LCD. Each aligned pair of microlenses is said to constitute a relay optical system having a magnification of 1. The rear electrodes of the LCD pixels constitute plain reflectors. The use of the second microlens array between the first microlens array and the LCD results in increased chromatic aberration which reduces the coupling efficiency of the device. Also, there are several interfaces between materials of different refractive index resulting in substantial losses due to Fresnel reflection which reduces the efficiency of the device. Further, the separation between the second array of microlenses and the reflective pixels results in loss of brightness because of vignetting. Also, it is necessary during manufacture to align the two microlens arrays in he counter substrate and then align this to the back plain of the LCD, which makes the device difficult and expensive to manufacture.

SUMMARY OF THE INVENTION

According to a first aspect of the invention, here is provided an optical device comprising an array of convergent microlenses disposed in front of a reflective spatial light modulator comprising a plurality of rear reflectors, characterised in that each of the near reflectors has convergent optical power.

Each of the reflectors may be arranged to form a laterally displaced image of a microlens aperture or a part thereof substantially at the plane of the apertures of the microlenses of the array. The size of the image may be substantially the same as the size of the microlens aperture or part thereof. For a predetermined direction of incident illumination, each of the reflectors may be arranged to form an image of a first microlens aperture or part thereof at or within a second microlens aperture or part thereof.

Each of the reflectors may have a focal length substantially equal to half the optical path between an associated one of the microlenses and the reflector.

Each reflector may have convergent optical power in a first direction transverse to an optical axis of the device and may have no optical power in a second direction transverse to the optical axis of the device and substantially perpendicular to the first direction. Each reflector may be blazed in the second direction and the first and second microlens apertures may comprise different parts of the same microlens aperture.

Each reflector may comprise a metallised relief structure. Each reflector may be faceted.

Each reflector may comprise a volume holographic element.

Each of the microlenses may have optical power in a third direction transverse to an optical axis of the device and no optical power in a fourth direction transverse to the optical axis of the device and substantially perpendicular to the third direction. The third and fourth directions may be substantially parallel to the first and second directions, respectively. The array of microlenses may comprise a one dimensional array of cylindrically converging microlenses.

Each microlens or part thereof may be associated with a respective set of the reflectors. The spatial light modulator may comprise a plurality of composite picture elements, each of which is associated with a respective microlens or part thereof, and comprises a plurality of sub-picture elements, each of which is associated with a respective one of the respective set of the reflectors. The reflectors of each set may be different from each other and corresponding reflectors of the sets may be substantially identical to each other.

The spatial light modulator may comprise a liquid crystal device. The reflectors may be disposed between a liquid crystal layer and a substrate of the liquid crystal device. The reflectors may planarised. As an alternative, a substrate of the liquid crystal device may have a surface relief corresponding to the reflectors so that the liquid crystal layer has a substantially uniform thickness.

According to a second aspect of the invention, there is provided a projection display characterised by comprising a device accordingly to the first aspect of the invention, an illumination system for illuminating the device, and projection optics for projecting an image corresponding to modulation of light from the illumination system by the spatial light modulator.

The projection optics may have an input pupil which is laterally spaced from an output pupil of the illumination system. The output pupil may be disposed off-axis with respect to the device. The input pupil may be disposed on-axis or off-axis with respect to the device.

The display may comprise a field lens disposed between the illumination system and the array of microlenses.

The illumination system may comprise separating means for angularly separating red, green and blue components of light for illuminating the spatial light modulator. The separating means may comprise a plurality of relatively tilted dichroic mirrors. As an alternative, the separating means may comprise a diffraction element, which may comprise a blazed diffraction grating.

The illumination system may be arranged to illuminate the spatial light modulator with light having a first polarisation and the projection optics may comprise a linear polariser for passing light from the spatial light modulator having a second polarisation substantially orthogonal to the first polarisation.

The device may comprise a linear polariser. The device may comprise a patterned half wave retarder comprising first regions whose optic axes are parallel or perpendicular to the transmission axis of the polariser and second regions whose optical axes are oriented at 45° to the optical axes of the first regions. As an alternative, the device may comprise: a patterned half wave retarder comprising first and second regions whose optic axes are oriented at +22.5° and −22.5° to the transmission axis of the polariser; and an unpatterned retarder whose optic axis is oriented at 67.5° to the transmission axis of the polariser.

The illumination system may comprise a linear to circular polarisation converter, the device may comprise a quarter waveplate and a linear polariser, and the projection optics may comprise a circular to linear polarisation converter. Each of the linear to circular and circular to linear polarisation converters may comprise a linear polariser and a quarter waveplate.

The term "optical power" as used herein has the conventional meaning, for example as disclosed in "Geometrical Optics and Lens Design", P. Mouroulis and J McDonald, Oxford University Press, 1997, ISBN 0-19- 508931-6, pages 40 to 43. In the case of a single spherical surface, optical power K is defined by K=c(n'−n), where c is the curvature of the surface, n and n' represent the refractive indices before and after the interface. For reflector systems, then n'=n−n. A surface must have a non-zero K value to possess optical power. A plane mirror has no power (c=0).

The focal length f of a single spherical surface is defined as 1/K. However, the focal length of a surface can be defined more generally and measured as the distance from the surface to the "circle of least confusion" for a collimated illumination at the appropriate cone angle. Thus, for "non-perfect"surfaces, there is still an imaging property of the surface that can be measured. The focal length is defined as being the focal length when measured in the relevant medium, for example in a counter substrate of the spatial light modulator.

The circle of least confusion is defined, for example in "Optics", Hecht and Zajac, Addison-Wesley, 1974, page 176, as being at the position at which the image blur of the focused spot has its smallest diameter.

In the case of spherical or similar reflectors, there is optical power in two orthogonal directions which are perpendicular to the optical axis of the reflector. However, a reflector can have optical power in a single direction, for example when the reflector is of the cylindrically converging type. In this case, the circle of least confusion is replaced by a strip of least confusion and is at the position at which the image blur of the focused strip has its smallest width. In this case, the optical power K is defined in the same way as for a single spherical surface but is in one direction (in the case of a cylindrical reflector, perpendicular to the axis of the cylinder and to the optical axis of the reflector).

The focal length of the converging reflectors of the present optical device may be substantially equal to half the optical separation of the microlenses from the reflectors when the distance from an "input" microlens for incident light to a reflector and the distance from the reflector to an "output" microlens for the reflected light are the same i.e. the input and output light paths are symmetrical. In some embodiments where input and output pupils are displaced in the second direction, the distance between the microlens and the reflector includes the inclination of light beams through the spatial light modulator, for example through the thickness of glass of a counter substrate. In the case of non-symmetrical input and output paths, the focal length can be adjusted accordingly to allow the input aperture to be imaged onto the output aperture.

The optimum converging reflecting surface may be as aspheric surface or a spheric surface. Height variations of the surface may be made compatible with, for example, a liquid crystal device manufacturing environment. For example, the surface of each reflector may be faceted to minimise surface undulations for liquid crystal materials. Such a surface may be fabricated from a single layer of photosensitive material by a grey-scale masking technique.

In order to achieve the correct focal length, the tilt angle of the surface may vary across the width of a sub-aperture and the tilt angle of the surface at any part of the surface of the sub-pixel may be close to the tilt angle of the equivalent optimum surface. Thus, the reflecting surface is a sub-pixel cannot be a single plane surface.

Although a diffractive surface may not have a surface curvature, nevertheless a diffractive surface may be arranged to focus light with a focal length as defined above. Such diffractive surfaces or structures thus constitute reflectors having convergent optical power.

A plane surface has an infinite focal length whereas an assembly of faceted plane surfaces with appropriate variations in tilt angles has a measurable focal length. Accordingly, such a faceted surface also constitutes a reflector having convergent optical power.

Although the device according to the first aspect of the invention may have other applications and uses, for example in optical computing, this device is particularly suitable for use in a projection display in accordance with the second aspect of the invention.

It is thus possible to provide a projection system using a relatively large spatially multiplexed device in a relatively compact reflector arrangement. Although colour filtering may be provided within the device in order to provide a colour projection display, such absorptive colour filters can be omitted so as to avoid light loss due to absorptive filtering. High aperture ratio field reflectors can be used so as to maximise efficiency and may be manufactured relatively easily. For example, such reflectors may be manufactured using a metallised surface relief photoresist technique which is compatible with existing LCD fabrication techniques.

It is possible to provide an arrangement in which the final pixel appearance is white with a very high aperture ratio. Such arrangements are extendable to higher resolutions. Arrangements using the crossed polariser mode, for example with a single large area polariser and patterned retarder or with an input polariser in a condensing system of the illumination system and a "crossed" output polariser at a point near a projection lens of the projection optics, have low light absorption and can provide a higher contrast ratio than may be achieved with standard single polariser mode arrangement. Also, front reflection artefacts from the device may be cancelled by means of a suitable polarisation arrangement before entering the projection optics and this provides an improved contrast ratio.

The device may make use of conventional liquid crystal modes so that it is possible to provide a low cost single panel projection system. For instance, high volume direct view display panels, possibly with relatively small modifications, may be used and specialist projection light valves are not required.

Vignetting which occurs in known types of displays can be eliminated or substantially reduced so as to reduce light loss and improve the display brightness for a given level of illumination. Also, input and output pupils can be separated so that a polarising beam splitter is not necessary. This reduces the cost and bulk of a projection display and eliminates the light losses associated with such beam splitters.

The use of a reflection panel allows a higher aperture ratio and hence the use of longer focal length microlenses compared with high resolution transmission type panels for reasons of efficient coupling of beam etendue through the system. Thus, it is more practical to incorporate the microlenses externally of the LCD and this reduces the cost and complexity of the system.

Some embodiment make use of a one dimensional microlens array, for example of the cylindrically converging lenticular screen type, and this has advantages over arrangements which use two dimensional microlens arrays. For example, a stripe LCD panel may be used rather than a delta LCD panel. Stripe panels are more easily available and are easier to manufacture then delta panel and non-standard pixel configuration panels.

Cylindrically converging lenses are easier to tolerance with respect to alignment with a stripe LCD panel. Also, such lenses are easy to make with substantially 100% aperture ratio compared with the generally lower aperture ratio of two dimensional microlenses. Further, such lenses have a reduced boundary area and this minimises scatter losses.

With such one dimensional microlens arrays, the output image is in the form of white stripes. This produces an image with substantially square pixels which provides improved viewed quality. In some embodiments, the input and output microlenses are different parts of the same lenticule so that irregularities between input and output surfaces may be minimised.

In the case where input and output pupils are separated along the cylindrical axis of the lenticules, the visibility of facet errors in faceted reflectors is reduced.

The reflecting element is a less complex shape and can be made to less strict tolerance compared with two dimensional microlenses because the imaging reflection is required in only one dimension. Thus, increased errors in surface shape can be accepted and this reduces complexity and cost. Also, there are fewer facet edges and this reduces light loss caused by poor imaging performance of facets. This also reduces the probability of degradation of alignment of the liquid crystal layer.

BRIEF DESCRIPTION OF THE DRAWINGS

The invention will be further described, by way of example, with reference to the accompanying drawings, in which:

FIG. 1 is a cross-sectional diagram of a first known projection system;

FIG. 2 is a cross-sectional diagram illustrating a detail of FIG. 1;

FIGS. 6 and 9 are diagrams illustrating vignetting in a known projection system;

FIG. 10 is a diagram illustrating absence of vignetting in the system of FIG. 5;

FIG. 16 shows diagrammatic cross-sectional and planned views of part of the system of FIG. 5 illustrating input and output pupil separation in a first direction;

FIG. 17 is similar to 16 but illustrates a greater separation between input and output pupils;

FIG. 18a is similar to FIG. 16 but illustrates input and output pupil separation in a second direction;

FIGS. 18b and 18c are cross-sectional views on section lines B—B and C—C, respectively, in FIG. 18a illustrating imaging paths;

FIG. 21 illustrates an arrangement of a curved reflector;

FIG. 22 illustrates an arrangement of a faceted reflector;

FIG. 24 is similar to FIG. 23, but illustrates a different arrangement of polarisers;

DESCRIPTION OF THE PREFERRED EMBODIMENTS

Figure 3:
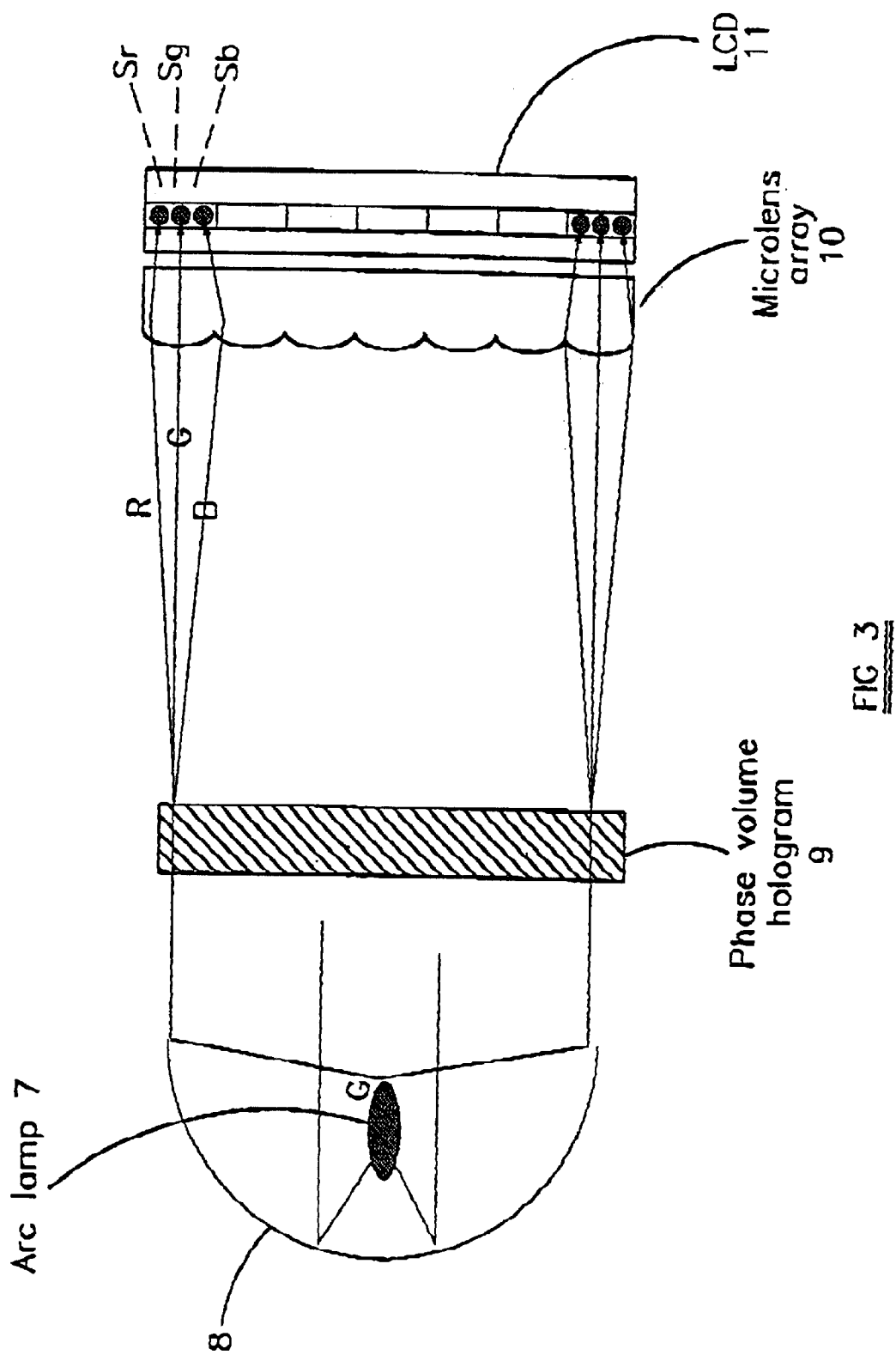
FIG. 3 is a cross-sectional diagram illustrating a second know projection system.

Like reference numerals refer to like parts throughout the drawings.

Figure 5:
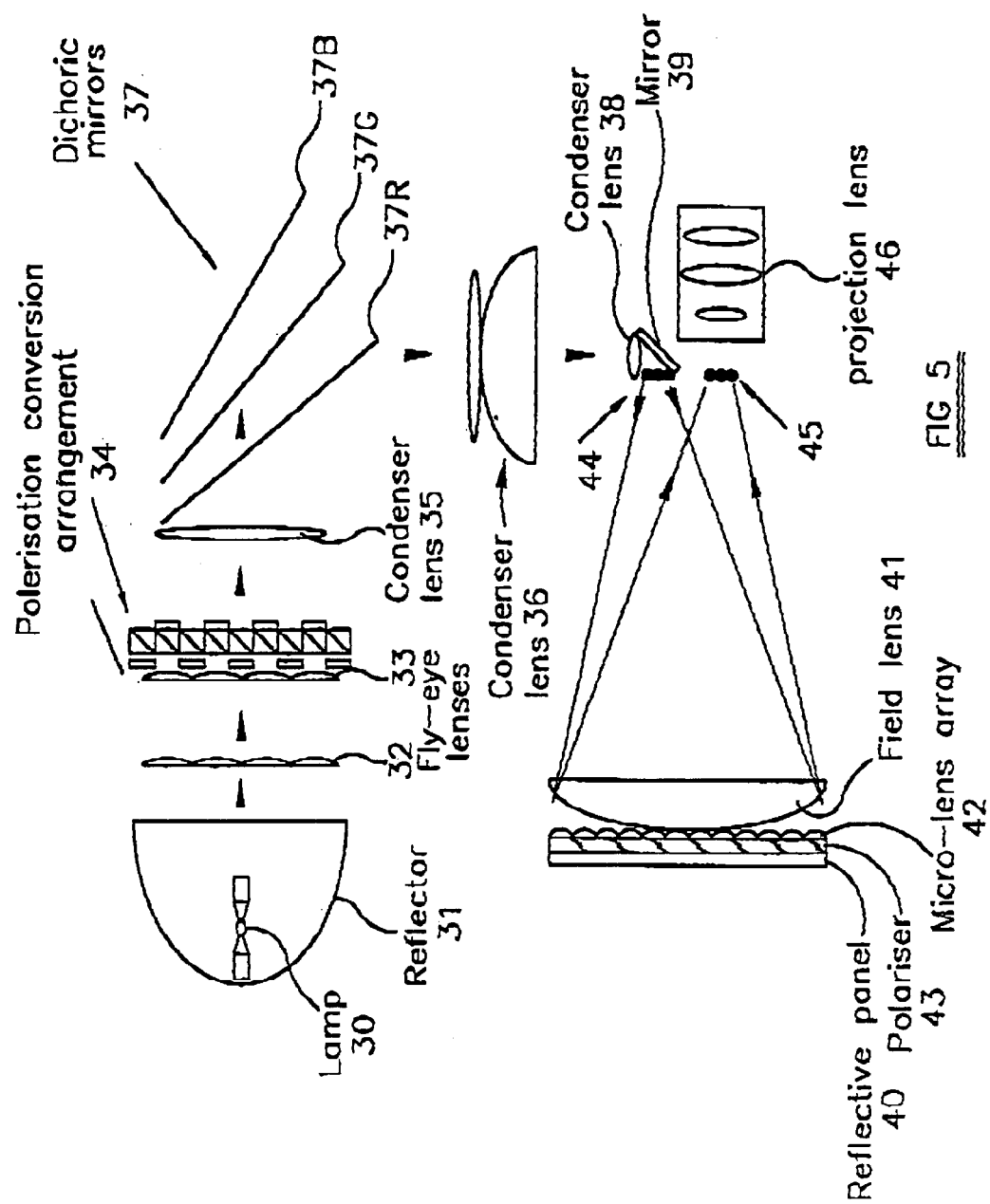
FIG. 5 is a cross-sectional diagram of a projection system constituting an embodiment of the invention.

The projection display shown in FIG. 5 comprises a light source 30, for example in the form of a high pressure metal-halide arc lamp, disposed within a parabolic reflector 31, which produces a substantially collimated output beam. The output beam is supplied through a first fly-eye lens 32 and a second fly-eye lens 33 to a polarisation conversion arrangement 34 of known type in the form of an array of polarising beam splitters and waveplates. The light is converted by the polarisation conversion arrangement 34 so that the output light is substantially linearly polarised in the s polarisation stats.

A first condenser lens 35 collects the light from the arrangement 34 and directs the light into a substantially homogenised linearly polarised patch of light at a second condenser lens 36 via a set of dichroic mirrors 37. The dichroic mirrors 37 comprise a mirror 37R which reflects red light and transmits the remainder of the spectrum, a mirror 37G which reflects green light and transmits the remainder of the spectrum, and a mirror 37B which reflects blue light and transmits the remainder of the spectrum. Alternatively since only blue light passes through both of the mirrors 37R and 37G, the mirror 37B may be a conventional silvered mirror or the like which reflects substantially all incident light. The mirrors 37R, 37G and 37B are tilted with respect to each other by a small angle so as to produce red, green and blue output light beams whose directions of propagation are also angled with respect to each other.

The second condenser lens 36 produces an image of the first condenser lens 35 at a third condenser lens 38. Light from the lens 38 is deflected by a plane mirror 39 towards a reflective LCD panel 40 so that the lens 38 forms an image of the lens 36 at the panel 40. The lens 38 thus represents an illuminating light source for the panel 40. Light from the lens 38 passes through a field lens 41, a microlens array 42 and a polariser 43 before being incident on the reflective panel 40. As an alternative, the lens 38 and the mirror 39 may be combined into a single element in the form of a curved reflector.

The output pupil of the illumination source, which acts as an input pupil for the parts 40 to 43 of the display, is shown at 44. The parts 40 to 43 direct light to an output pupil shown at 45 and representing the input pupil of a projection lens 46. The input and output pupils 44 and 45 are laterally displaced from each other.

Figure 6:
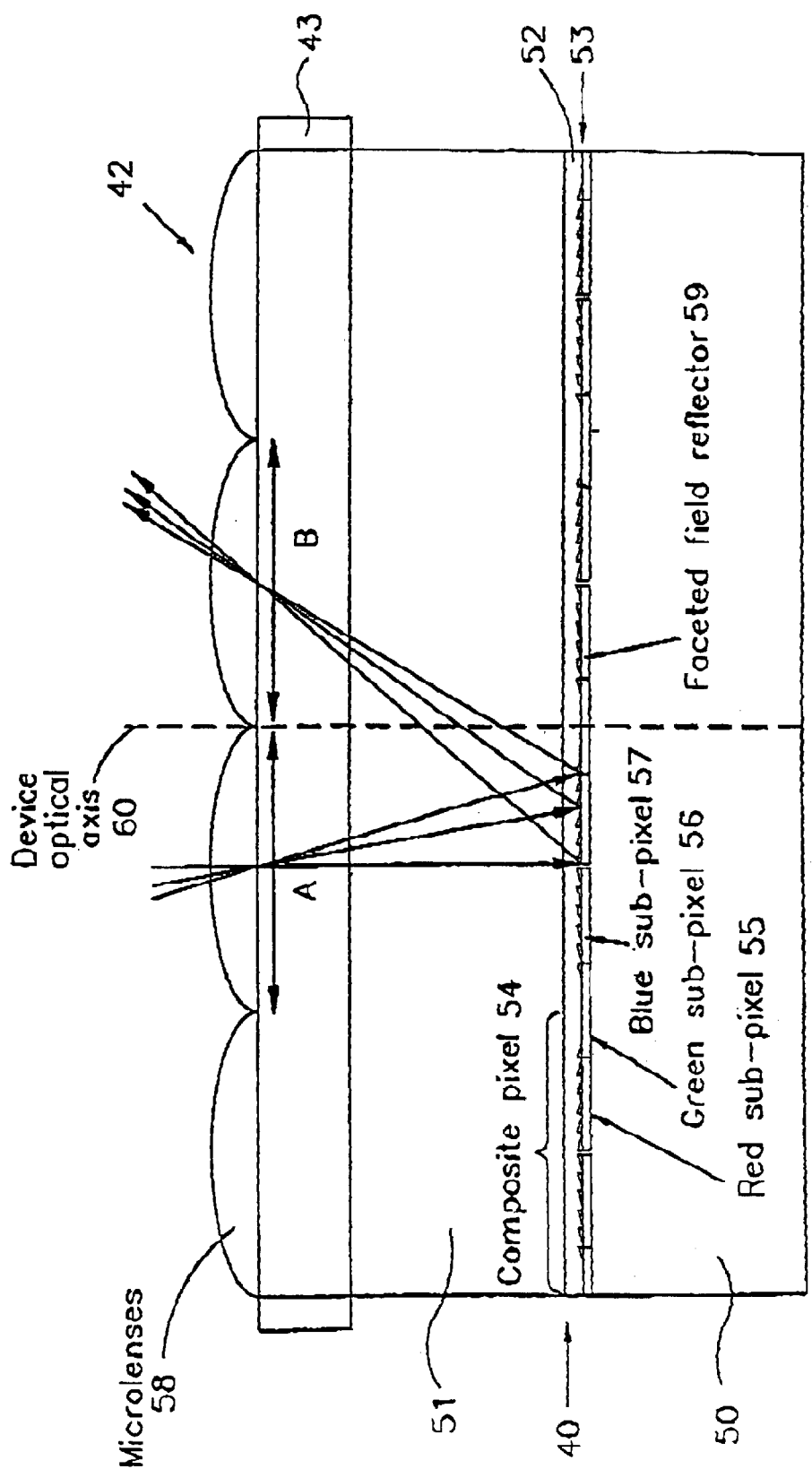
FIG. 6 is a cross-sectional diagram of an SLM of the system of FIG. 5 constituting an embodiment of the invention.

The reflective LCD panel 40, the microlens array 42 and the polariser 43 are shown in more detail in FIG. 6. The panel 40 comprises a substrate 50, a counter-substrate 51, a liquid crystal layer 52 and a reflector arrangement 53. Electrodes, alignment layers and other elements of the LCD panel 40 are not shown for the sake of clarity. The panel 40 is pixellated so as to comprise a plurality of composite pixels 54, each of which comprises a red sub-pixel 55, a green sub-pixel 55 and a blue sub-pixel 57. The array 42 comprises a plurality of microlenses 58. The array 42 may comprise a two dimensional array, for example, of square or rectangular microlenses, in which case each microlens 58 is associated with a respective composite pixel 54. Alternatively, as illustrated, the array 42 may comprise a one dimensional array of lenticular microlenses so that each microlens 58 is disposed above a respective column of composite pixels 54.

The reflector arrangement 53 comprises a plurality of field reflectors 59, which are shown as being faceted in FIG. 6. Each field reflector 59 has convergent optical power in a direction which is transverse to the device optical axis 60 but has no optical power in a second direction which is transverse to the axis 60 and to the plane of FIG. 6. The faceted surface has substantially the same effect as a continuous relief structure except that the overall thickness is reduced. In the embodiment shown in FIG. 6, each of the reflectors 59 is cylindrically converging with its focal length being substantially equal to half the distance between the reflector and the plane of the apertures of the microlenses array 42. Thus, for incident light of a predetermined angle, each reflector 59 forms an image of the aperture A of one microlens at or within the aperture B of an adjacent microlens or, as described hereinafter, at a different part of the same microlens.

Figure 7:
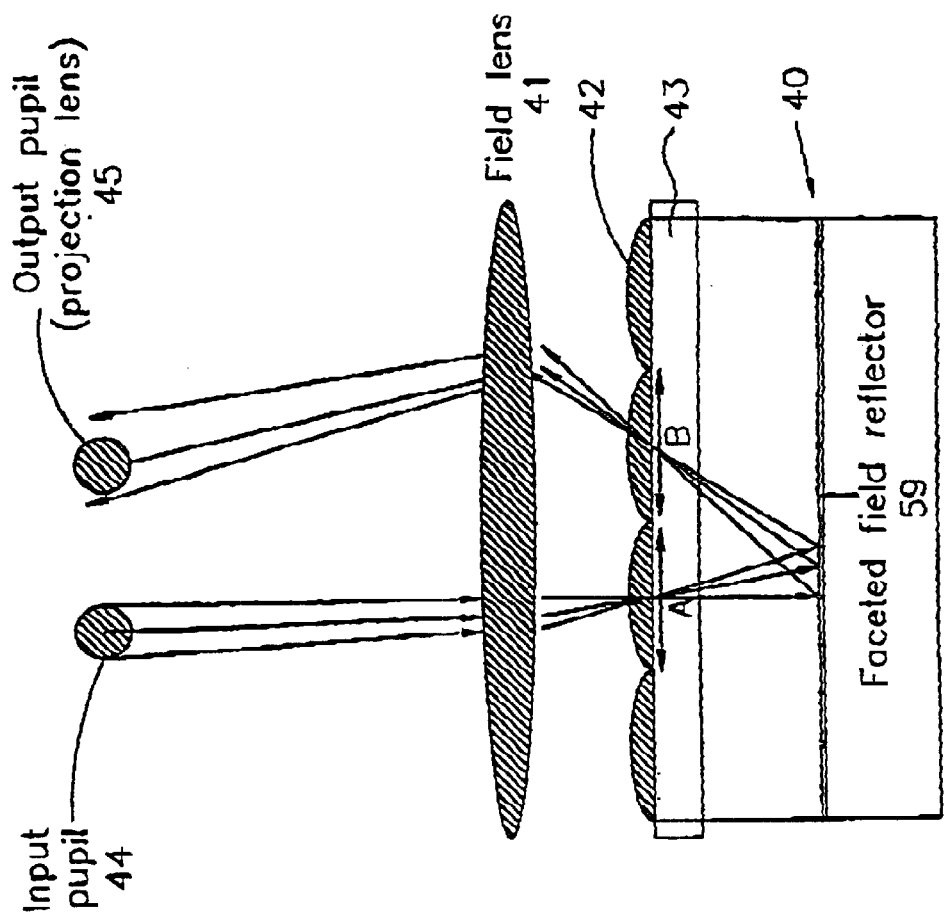
FIG. 7 is a cross-sectional diagram illustrating part of the system of FIG. 5.

FIG. 7 illustrates the operation for one of the component colour illuminating beams from the input pupil 44. The microlens images the incident light to an image at the plane of the liquid crystal layer 52 of the LCD panel 40. Each image is associated with the aperture of a pixel and, because the red, green and blue illumination directions are angularly separated, red, green and blue images are produced and aligned with the apertures of respective sub-pixels 55 to 57.

The field reflectors 59, which are disposed immediately adjacent the liquid crystal layer 52, have optical power in the transverse direction shown in FIG. 7 so that, for example, the aperture A of an "input" microlens is imaged onto the aperture B of an "output" microlens (which may act as an input microlens for an adjacent composite colour pixel). The input pupil 44 is imaged to the output pupil 45.

FIGS. 8 to 10 compare the performance of the projection system illustrated in FIGS. 5 to 7 with that of the known system, for example as disclosed in U.S. Pat. No. 5,825,443. For the sake of clarity, these systems are illustrated in FIGS. 8 to 10 as the equivalent transmission systems so that the ray paths can be more easily followed. Thus, as shown in FIGS. 8 and 9, the equivalent transmission system to the reflective arrangement of known type at the device level comprises input and output microlenses 61 and 62 and an LCD panel 63. In the known arrangement, the reflector has no optical power whatever but is merely a plane mirror. Thus, for incident light passing through the centre of the pixel 63, all of the incident light will be reflected as output light. However, for light passing through an edge of the pixel 63 as shown in FIG. 9, only part of the illuminating light cone will be supplied to the projection lens. The remaining part of the light cone is lost because of vignetting from the edge of the pixel.

FIG. 10 illustrated the equivalent arrangement for the display shown in FIGS. 5 to 7. In this case, the field reflector 59 is illustrated as the transmissive-mode equivalent of a converging lens. The element 59 images the aperture of the input microlens 61 onto the aperture of the output microlens 62 and the effect of this is to ensure that substantially all of the input cone of illuminating light passes through the microlens 62 and hence to the projection lens so that light loss caused by vignetting is greatly reduced or eliminated. Accordingly, for a given illuminating power, a brighter display may be produced.

Figure 11:
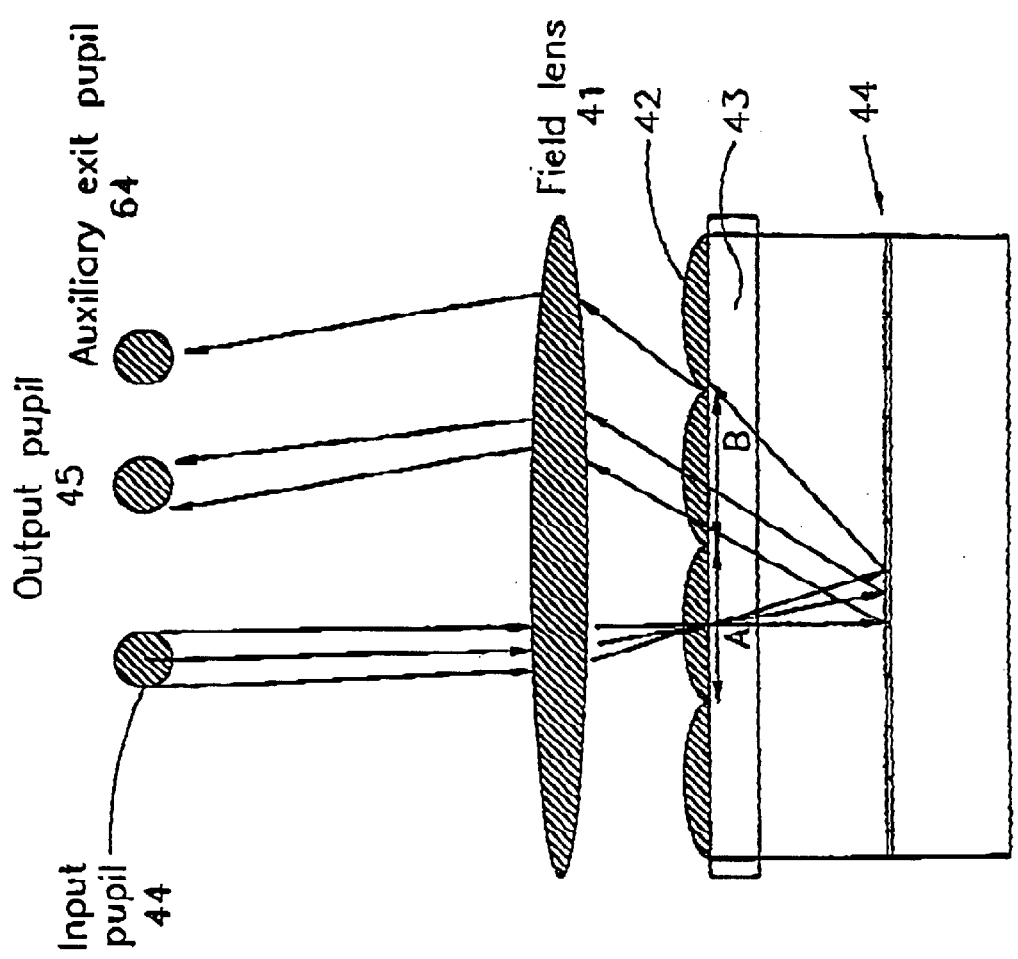
FIG. 11 is a diagram of part of a known type of projection system illustrating the results of vignetting.

FIG. 11 illustrates the effect of vignetting on a known type of systems which is smaller to that shown in FIG. 7 but in which the field reflectors with optical power are replaced by plane reflectors with no optical power. The effect of vignetting is to lose reflected light to an auxiliary exit pupil 64. Such light is not gathered by the projection optics whose input pupil corresponds to the output pupil 45. Thus, the brightness of the image produced by the display is reduced. If the projection lens is large enough to capture the light from the adjacent pupil 64 as well as the main pupil 45, then the light from adjacent composite colour pixels will appear to come from the same microlens and will then be mixed on the projection screen so that the modulation transfer function of the display will be degraded. Additionally, such a high numerical aperture of capture of the projection lens is unlikely to produce satisfactory aberrational performance.

Figure 4:
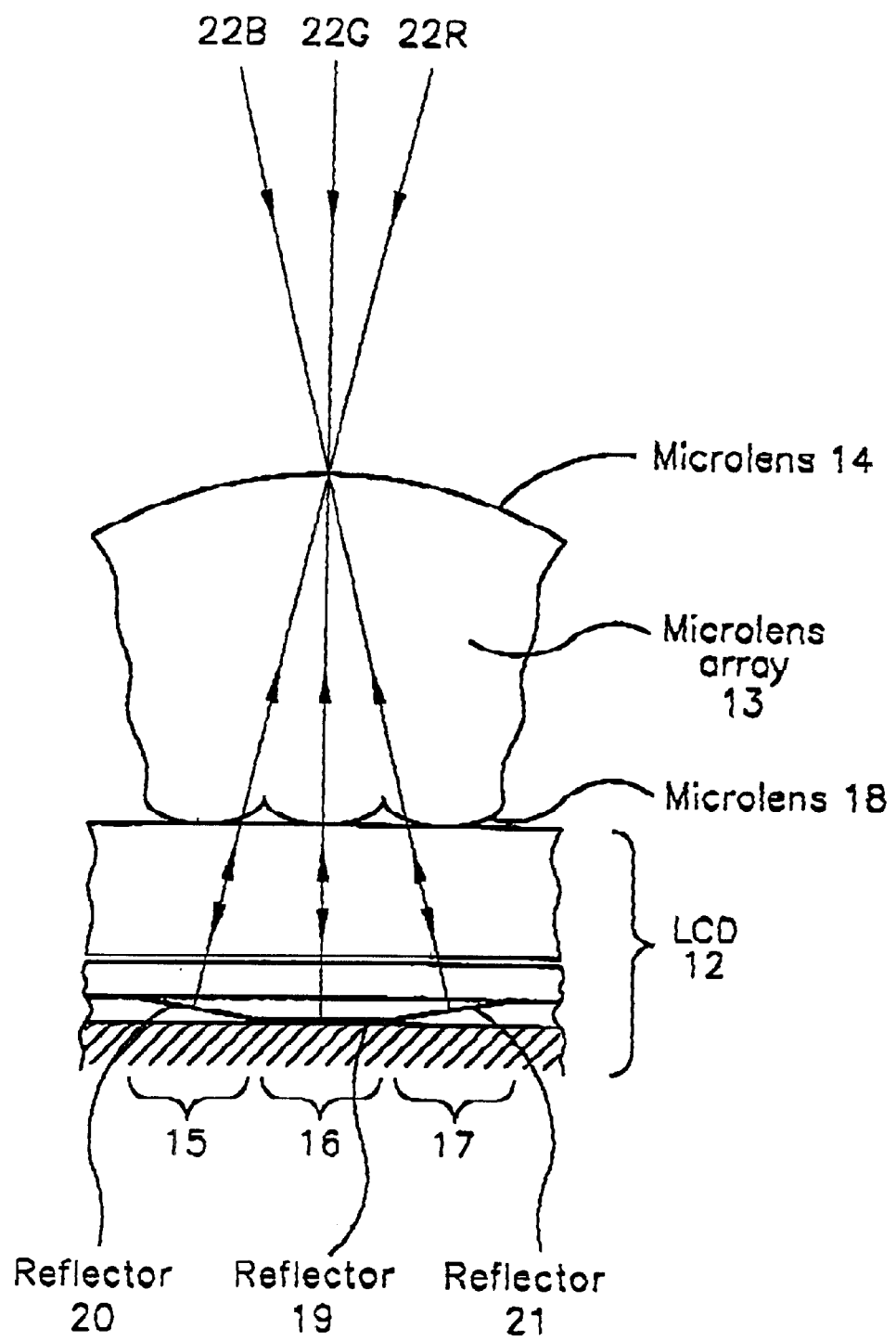
FIG. 4 is a cross-sectional diagram illustrating a third known projection system.
Figure 12:
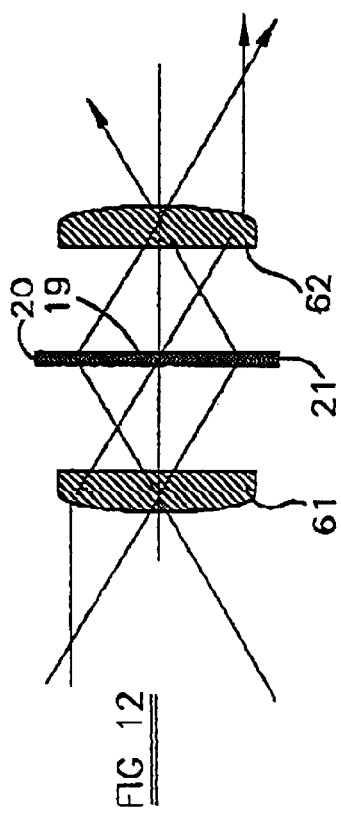
FIGS. 12 and 13 are diagrams illustrating vignetting in systems of the type shown in FIG. 4.
Figure 13:
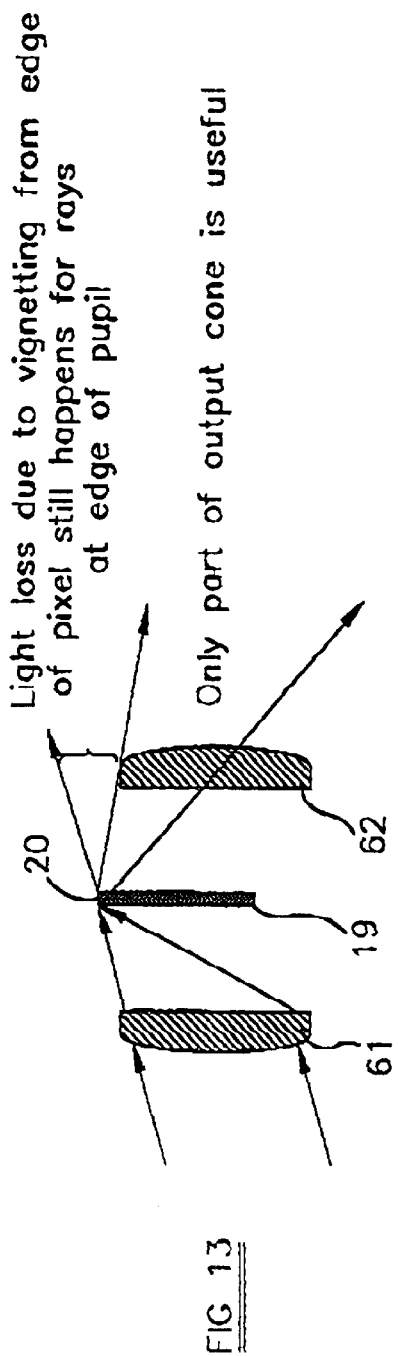
Figure 14:
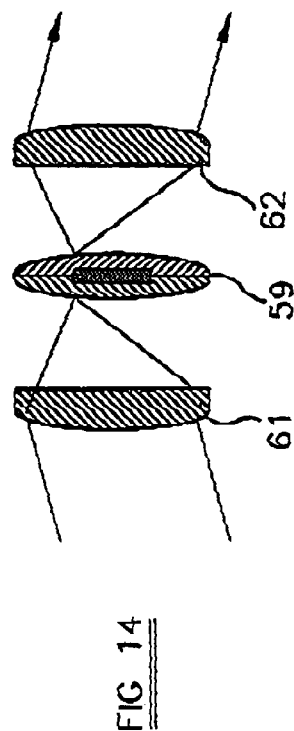
FIG. 14 is a diagram illustrating absence of vignetting in the system shown in FIG. 5.

FIGS. 12 to 14 are similar to FIGS. 8 to 10, respectively, but compare the performance of the display shown in FIGS. 5 to 7 with the known type of display shown in FIG. 4 having the inclined plane reflectors 19 to 21. Thus, the edge sub-pixels have the tilted plane mirrors 20 and 21 which steer light back towards the centre of the output pupil. FIG. 13 illustrates that vignetting still occurs for this system whereas, as shown in FIG. 14, the field reflector 59 with convergent optical power substantially removes or avoids this effect.

Figure 15:
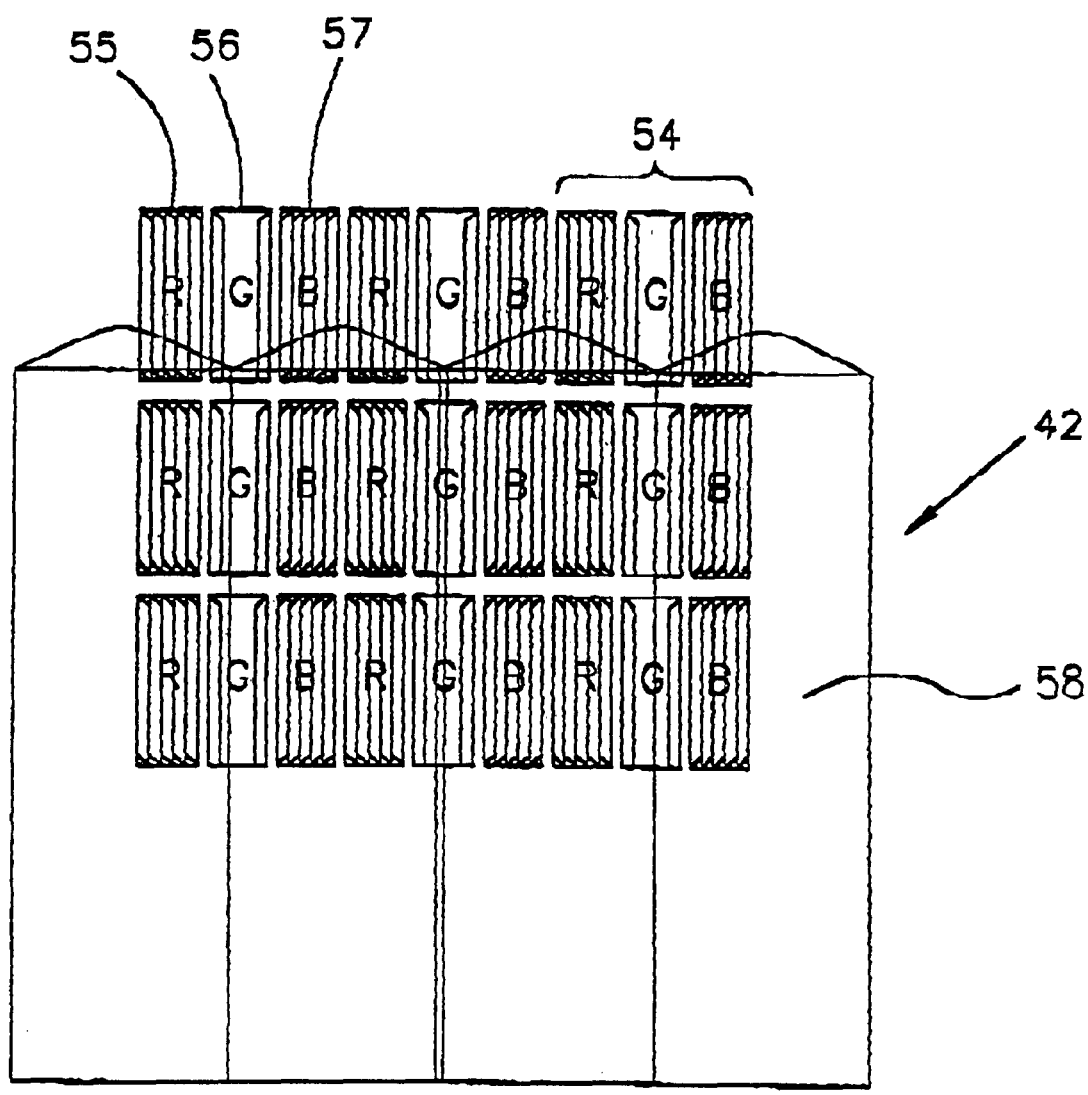
FIG. 15 is a diagram illustrating the relative arrangement of pixels and lenticules in the system of FIG. 5.

FIG. 15 illustrates the relative lateral alignment of the composite pixel 54 and the colour component sub-pixels 55 to 57 with the microlenses 58 of the array 42. The pixels and sub-pixels are arranged as a rectangular array of rows and columns and the lenticules of the array 42 are arranged in the column direction. Adjacent pairs of lenticules 42 are arranged symmetrically over a respective column of composite pixels 54. Such an arrangement produces input and output pupils which are "horizontally" separated by one pupil separation as illustrated in FIG. 16. Each reflector 59 forms an image of the aperture A of part of one microlens at the aperture B of the adjacent microlens. The remaining optical system of the display forms the output pupil immediately adjacent the input pupil 46.

FIG. 17 illustrates a modified arrangement in which the input and output pupils 44 and 45 are separated by two pupil separations or pitches. In this case, each reflector 59 forms an image of the aperture A at the aperture B of the next but one microlens.

FIGS. 18a to 18c illustrate an alternative arrangement in which the input and output pupils are "vertically" separated by an arbitrary separation. In this case, each reflector images a microlens aperture back onto the same microlens aperture as shown in FIG. 18b but at a spacing in the direction of the cylindrical axis of the microlenses as shown in FIG. 18c.

Figure 19:
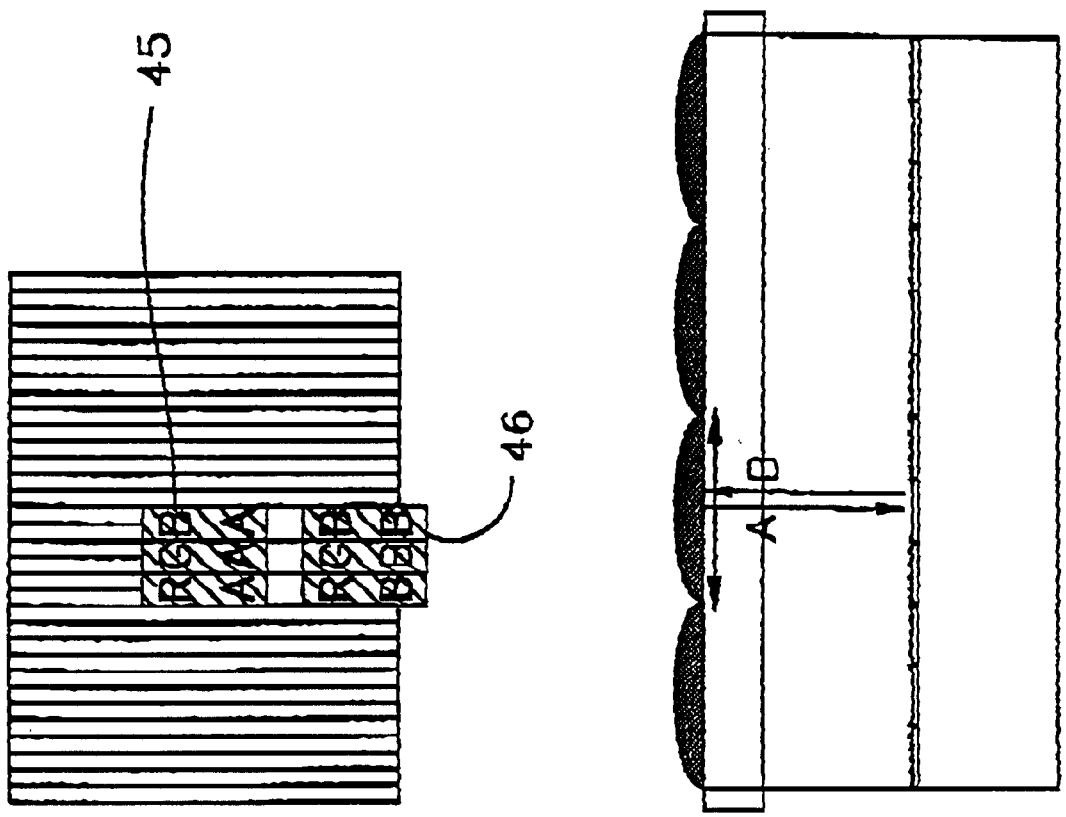
FIG. 19 is similar to FIG. 18a, but illustrates an off-axis input pupil and an on-axis output pupil.
Figure 20:
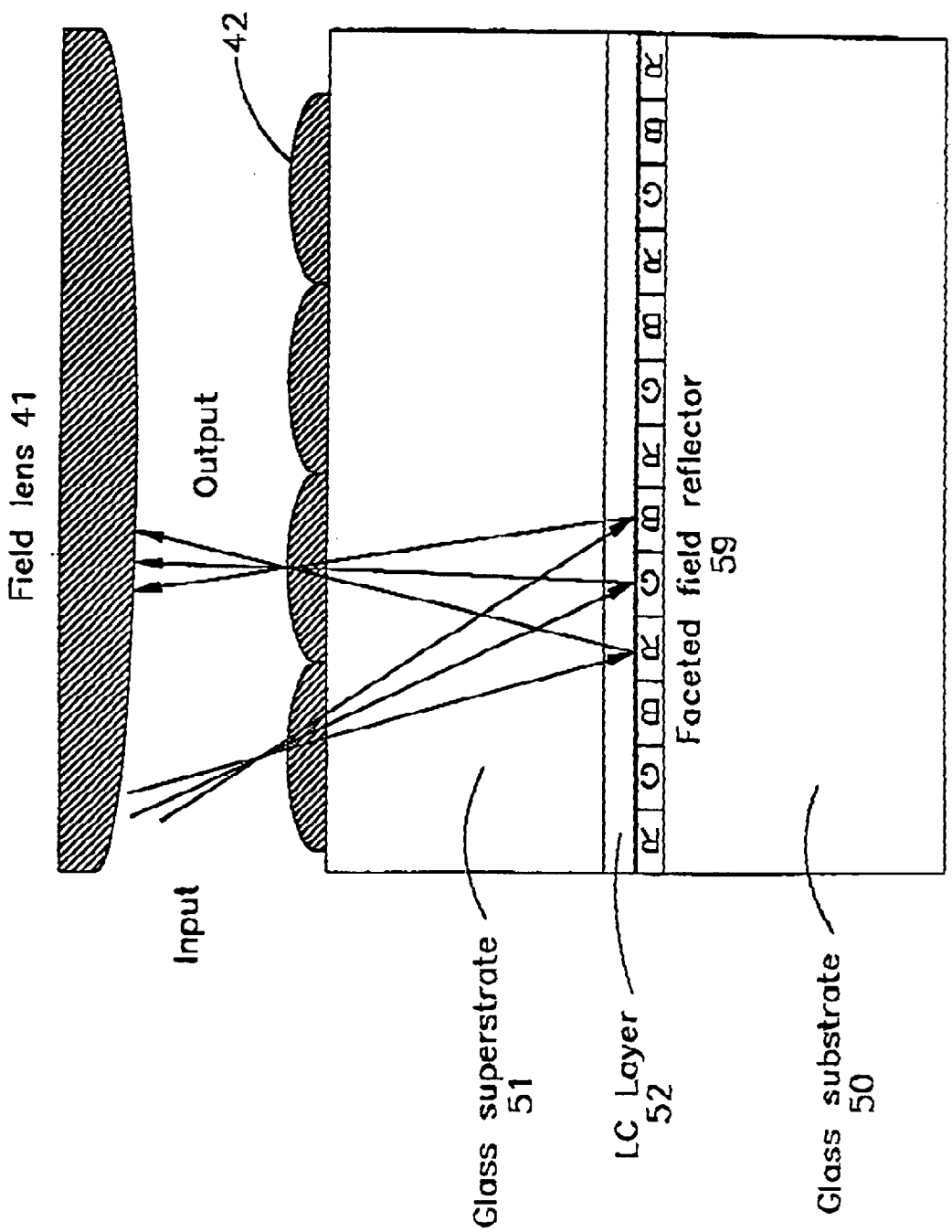
FIG. 20 is a view similar to that of FIG. 6, but illustrating an arrangement for achieving the pupil arrangement of FIG. 19.

FIG. 19 illustrates a modified arrangement of the type shown in FIG. 18 in which an off-axis illumination results in a central output pupil. In order to achieve this, the reflectors 59 are blazed in the second direction i.e. that perpendicular to the direction in which they have optical power. An arrangement for achieving such off-axis input on-axis output is illustrated in FIG. 20.

FIG. 21 illustrates one possible arrangement of the field reflectors 59, in which the reflectors for the three sub-pixels 55 to 57 of a composite pixel are combined into a single curved reflector surface. FIG. 21 also illustrates at 59' how the angle curved surface may be replaced by an equivalent faceted surface.

FIG. 22 illustrates another field reflector arrangement comprising an array of blazed plane surfaces, each of which has a different tilt. There is a plurality of such surfaces across the aperture and the effect of this is to provide a reflector of focal length such that a focused image is produced at or near the aperture of the output microlens.

Figure 23:
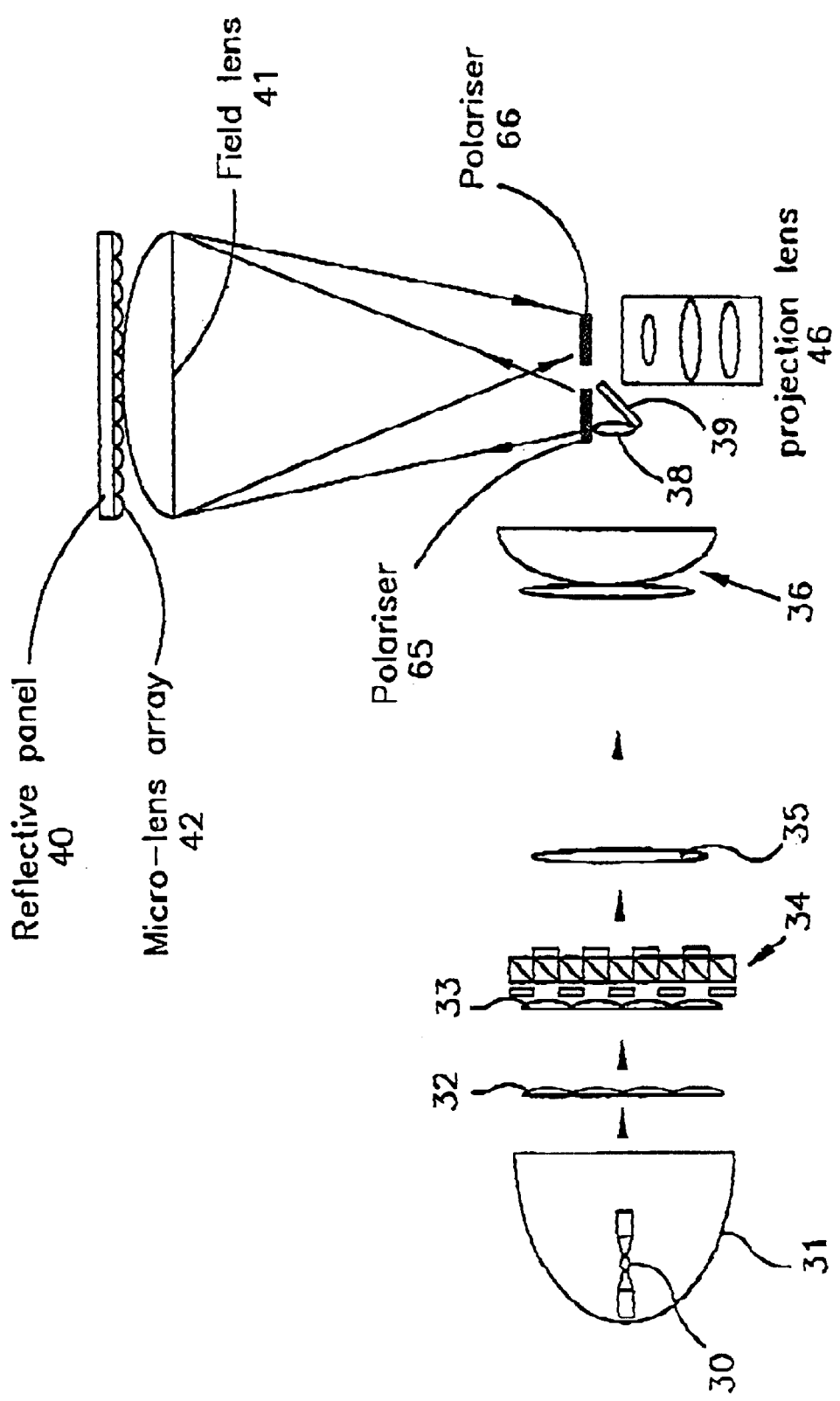
FIG. 23 is a cross-sectional diagram illustrating a projection system constituting another embodiment of the invention and having a crossed polariser liquid crystal mode of operation.

The display shown in FIG. 23 differs from that shown in FIG. 8 in that the polariser 43 is omitted and individual polarisers 65 and 66 are provided (the dichroic mirrors are not shown in FIG. 23 for the sake of clarity). The polarisers 65 is located at the input aperture and performs a "clean-up" function to ensure that the illuminating light which is incident on the reflective panel 40 is linearly polarised to a high degree. The polariser 66 is located at the output pupil and acts as an analyser for light from the liquid crystal pixels. The polarising axes of the polarisers 65 and 66 are orthogonal to each other so as to provide a crossed polariser liquid crystal mode of operation. In this case, the polariser 43 may be omitted.

The optical intensity at the polarisers 65 and 66 may be sufficiently high to degrade the performance of these polarisers. FIG. 24 shows an alternative arrangement in which the polarisers 65 is located in the illumination system where light intensity is much less. Similarly, the analyser 66 is disposed at the output of the projection lens 66 where the light intensity is much less. In this case, the analyser 66 comprises a non-absorbing polariser 67 and an absorbing polariser 68. Again, the polariser 43 may be omitted.

Figure 25:
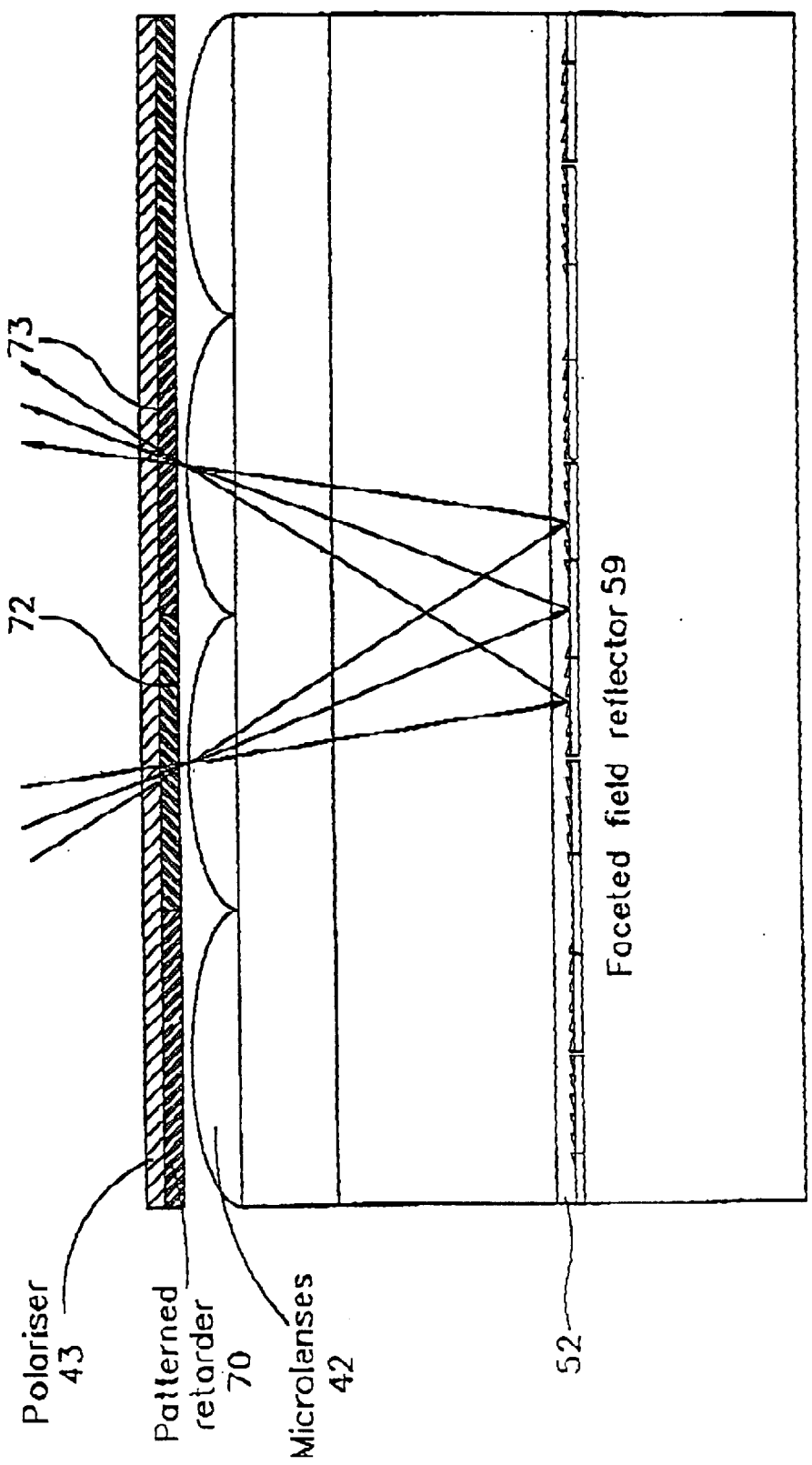
FIG. 25 is a cross-sectional diagram illustrating a device constituting an embodiment of the invention and including a patterned retarder to provide a crossed polariser liquid crystal mode of operation.
Figure 26:
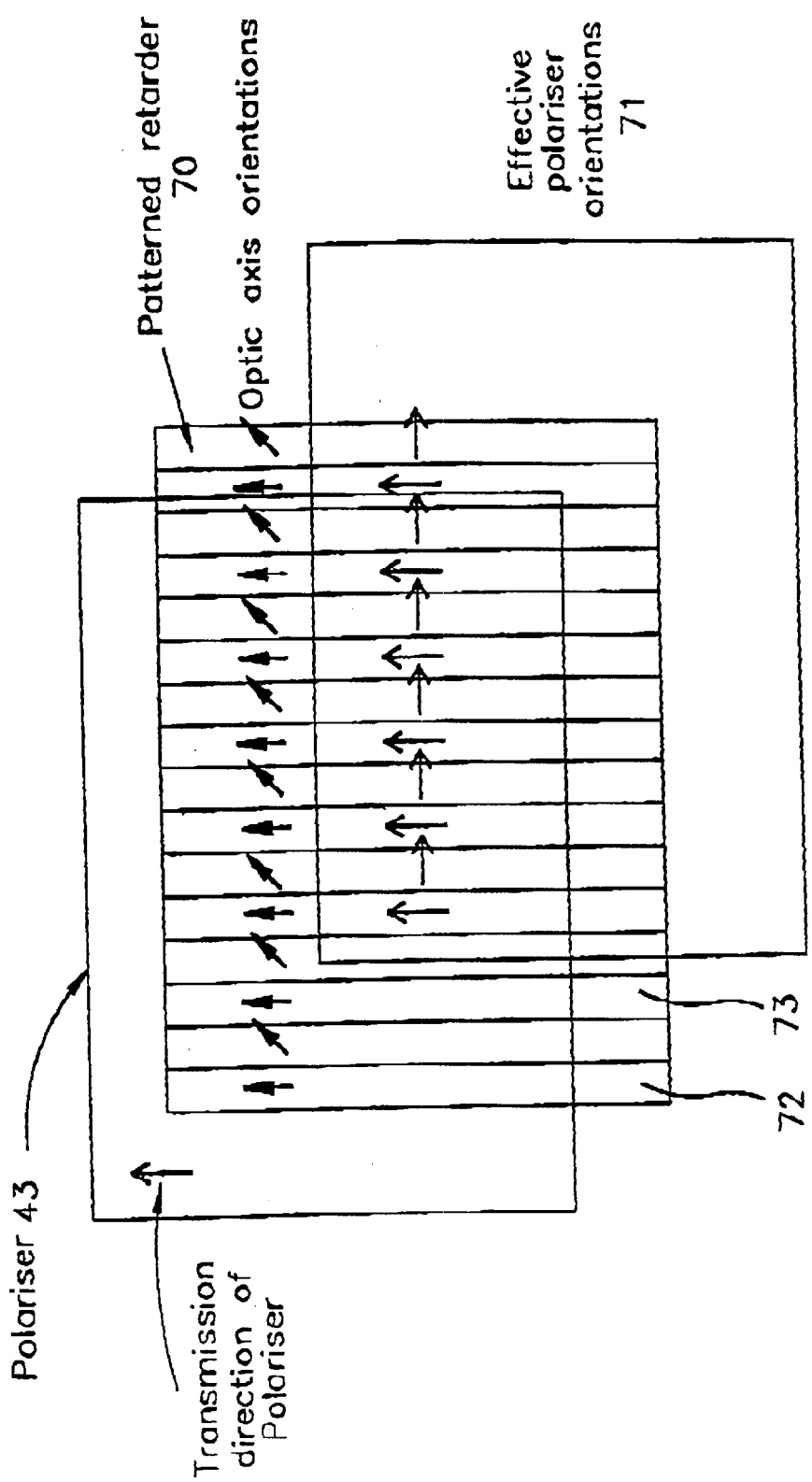
FIG. 26 is a diagram illustrating polarising and optic axis of parts of the device shown in FIG. 25.

The display shown in FIG. 5 has the LCD panel 40 operating in the single polariser mode. However, such an arrangement may have limited contrast performance and may be modified to operate as a crossed polariser device as shown in FIG. 25. In this case, a patterned half wave retarder 70, for example of the type disclosed in GB 2 326 729 and EP 0 887 667, is disposed between the polariser 43 and the liquid crystal layer 52. FIG. 26 illustrates the relative orientations of the transmission direction of the polariser 43 and the optic axes of the strips of the patterned retarder 70. The effective polarisation orientations of the light passing through the polariser 43 and the retarder 70 are illustrated at 71. The transmission direction of the polariser 43 is parallel to the optic axes of a first set of strips of the patterned retarder whereas the optic axes of a second set of strips, each of which is disposed between two of the first set of strips, is oriented at 45° to the transmission direction of the polariser 43. Thus, light passing through the first strips such as 72 has its polarisation direction unchanged whereas light passing through the second strips such as 73 has its polarising direction rotated through 90°.

As shown in FIG. 25, the strips 72 and 73 are aligned with respective microlenses 42. Incident light for the liquid crystal layer 52 passes through, for example, a first strip 72 whereas the reflected light passes through the adjacent strip 73. This arrangement is equivalent to a liquid crystal mode with crossed polarisers and thus provides improved contrast ratio performance.

Figure 27:
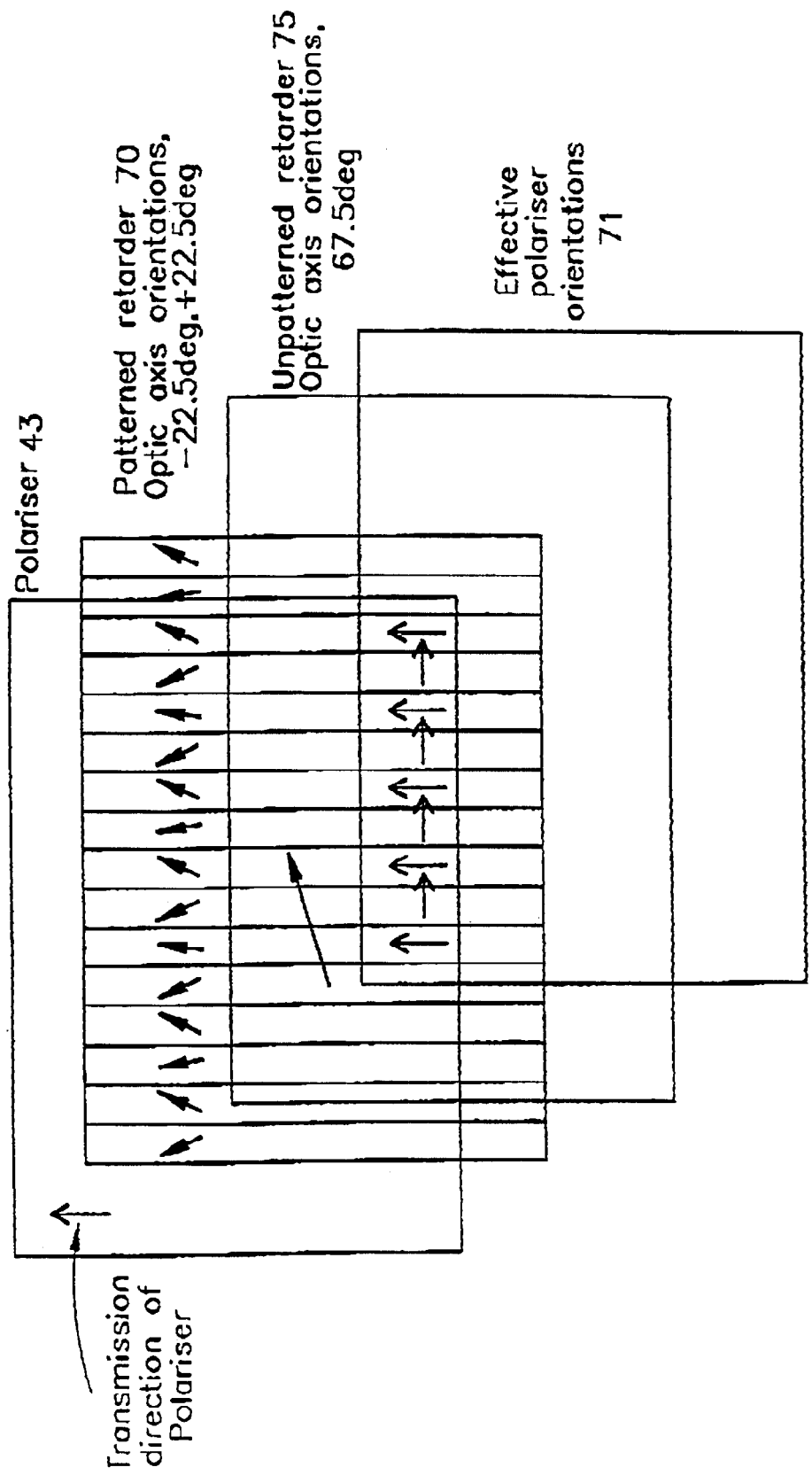
FIG. 27 is similar to FIG. 26, but illustrates an alternative retarder arrangement.

FIG. 27 illustrates an alternative embodiment in which the patterned retarder 70 has alternate optic axes oriented at +22.5° and −22.5° with respect to the transmission direction of the polariser 43. The retarder 70 is disposed between the polariser 43 and an unpatterned half wave retarder 75 whose optic axis is oriented at +67.5° to the transmission direction of the polariser 43. The operation of this arrangement is substantially the same as that illustrated in FIG. 26 but the performance is more achromatic.

Figure 28:
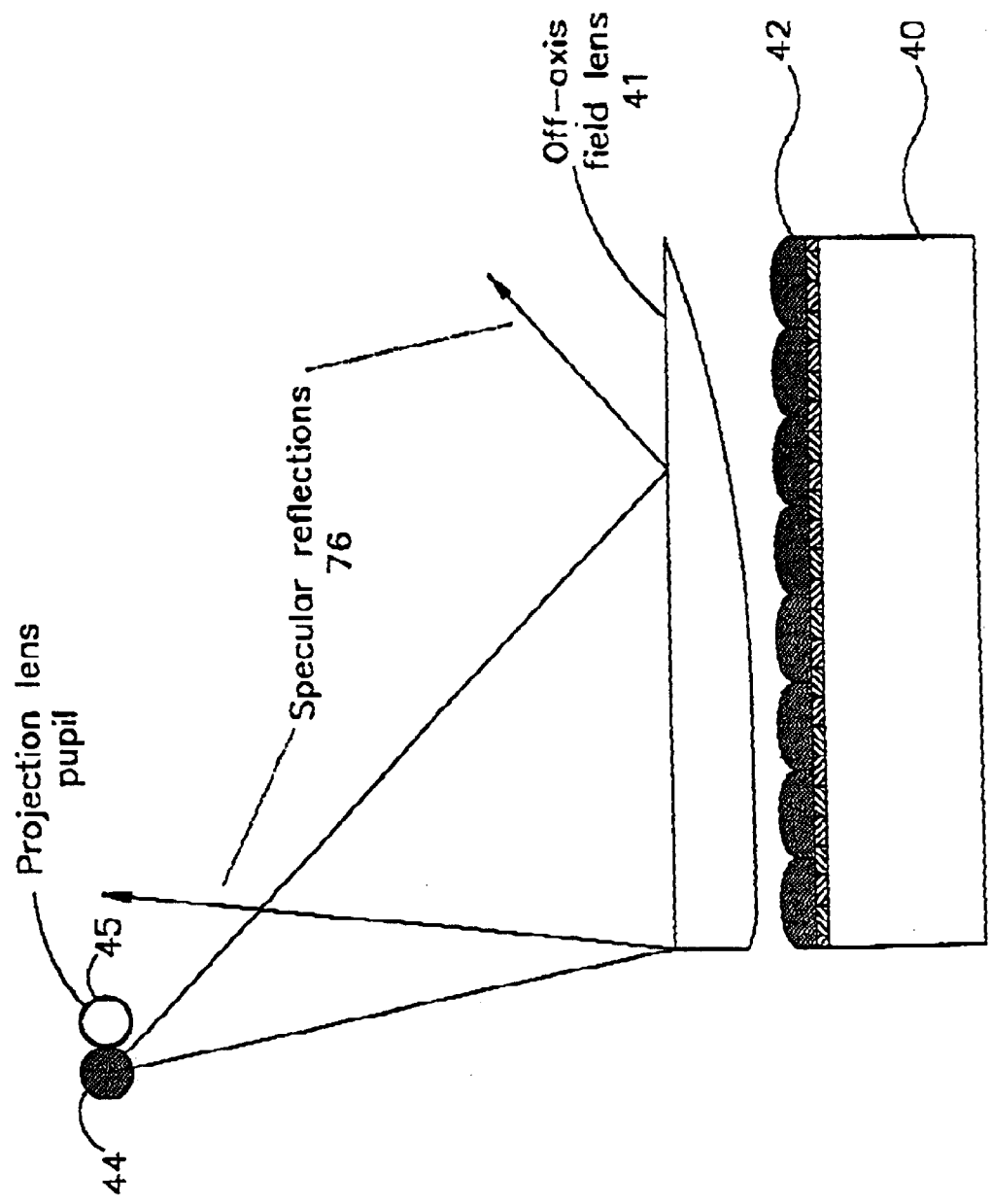
FIG. 28 is a cross-sectional diagram illustrating off-axis input and output pupils.

FIG. 28 illustrates a projection display which differs from that shown in FIGS. 5 to 7 in that the input and output pupils 44 and 45 are disposed off-axis with respect to the panel 40. An off-axis field lens 41 is used in this arrangement.

An advantage of this arrangement is that specular reflection occurring within the device 40 and the associated parts are directed away from the output pupil 45. For example, specular reflections 76 from the input surface of the field lens 41 are illustrated in FIG. 28 and are directed away from the projection lens pupil which coincides with the output pupils 45. Thus, such an off-axis arrangement reduces the amount of stray light entering the projection lens and has an improved contrast ratio.

In this respect, the crossed polariser arrangements illustrated in FIGS. 23 and 24 provide good rejection of stray light because specularly reflected stray light has substantially the same polarisation as the illuminating light and is extinguished by the output polariser.

Figure 29:
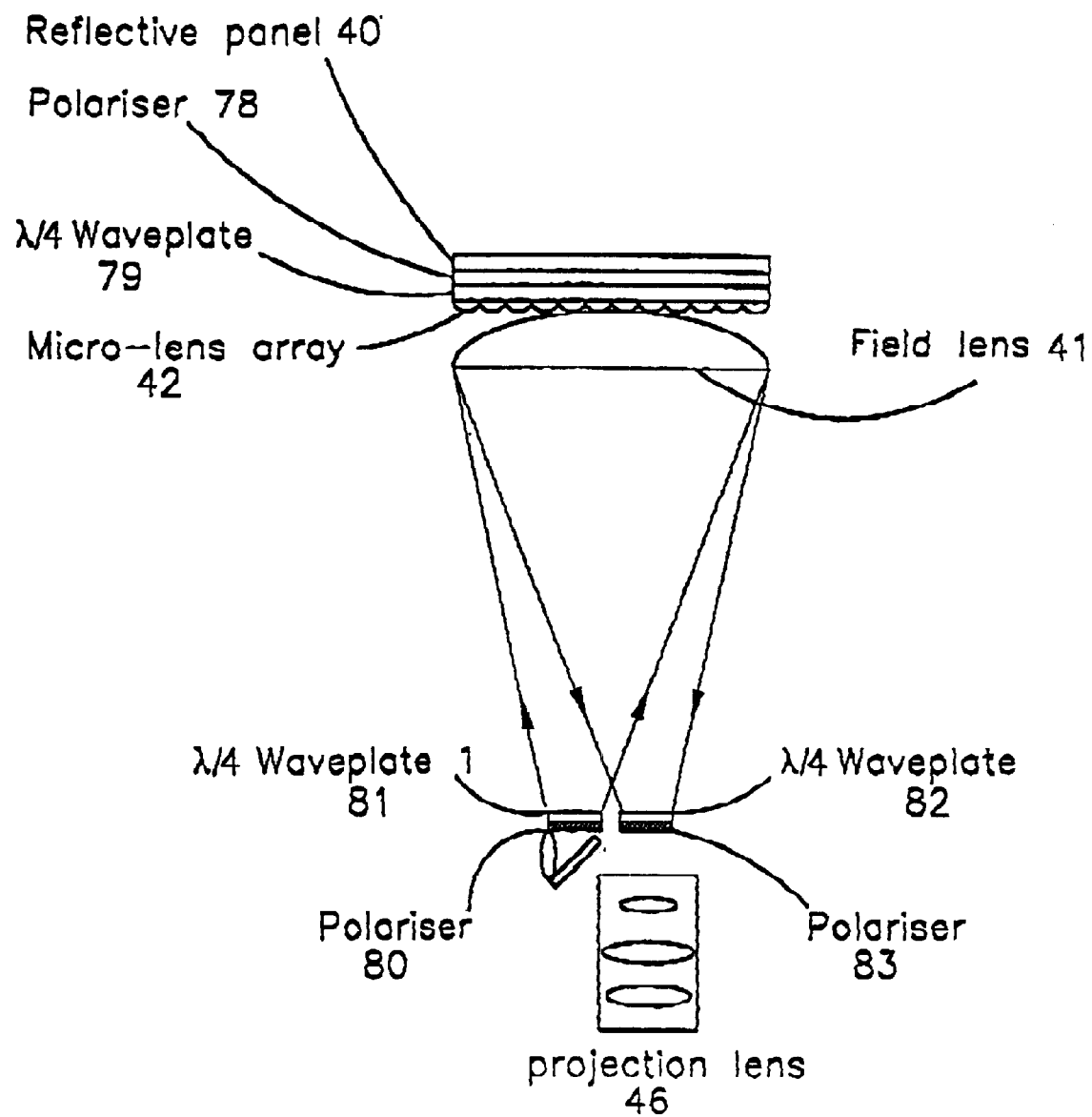
FIG. 29 is a cross-sectional diagram illustrating a polarising arrangement for reducing the effects of specular reflection.

FIG. 29 illustrates another arrangement for improving the contrast ratio by reducing the effects of Fresnel reflections at the field lens 41 and the microlens array 42 in a single-polarisation type of configuration. A linear polariser 78 and a quarter waveplate 79 are disposed between the reflective panel 40 and the microlens array 42. A linear to circular polarisation converter comprising a linear polariser 80 and a quarter waveplate 81 are disposed at the input pupil whereas a circular to linear polarisation converter comprising a quarter waveplate 82 and a linear polariser 83 are disposed at the output pupil.

Figure 30:
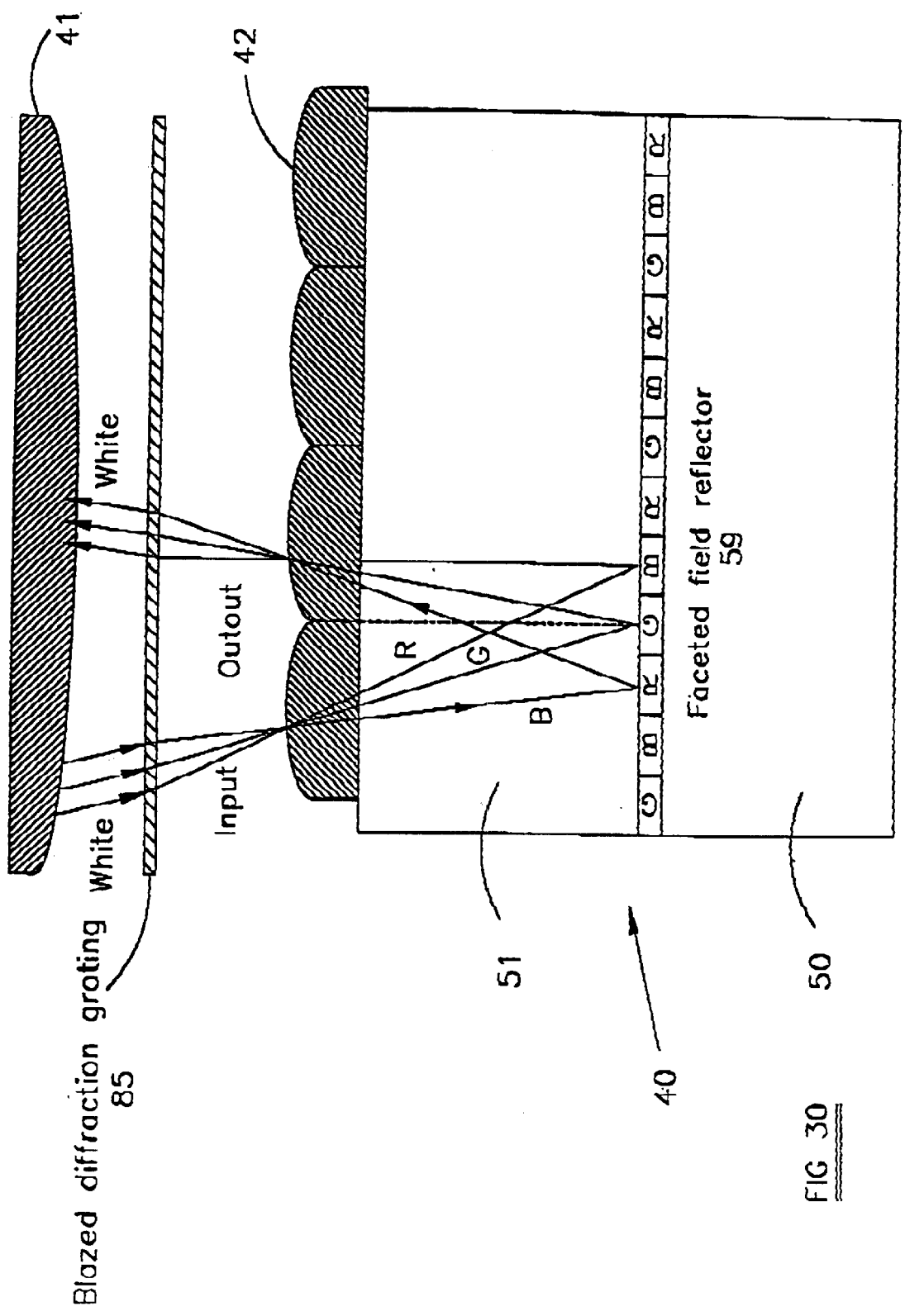
FIG. 30 is a cross-sectional diagram of a device illustrating an alternative colour separation arrangement.

FIG. 30 illustrates an arrangement which differs from that shown in FIG. 5 in that the dichroic mirrors 37 for separating the colour components of illuminating light are omitted and colour separation is performed by a blazed diffraction grating 85 or equivalent holographic optical element disposed between the field lens 41 and the microlens array 42. Light incident on the grating 85 is split into its spectral component directions by the dispersion of the diffraction grating. Upon reflection from the pixel 50, the dispersively separated light is recombined by the same transmission grating to produce a white image of the illumination source at the projection lens pupil. Such an arrangement does not increase the optical etendue of the light or separate the colour pupils in the aperture of the projection lens (separation of colour pupils results in different aberrations for the red, green and blue components).

Figure 31:
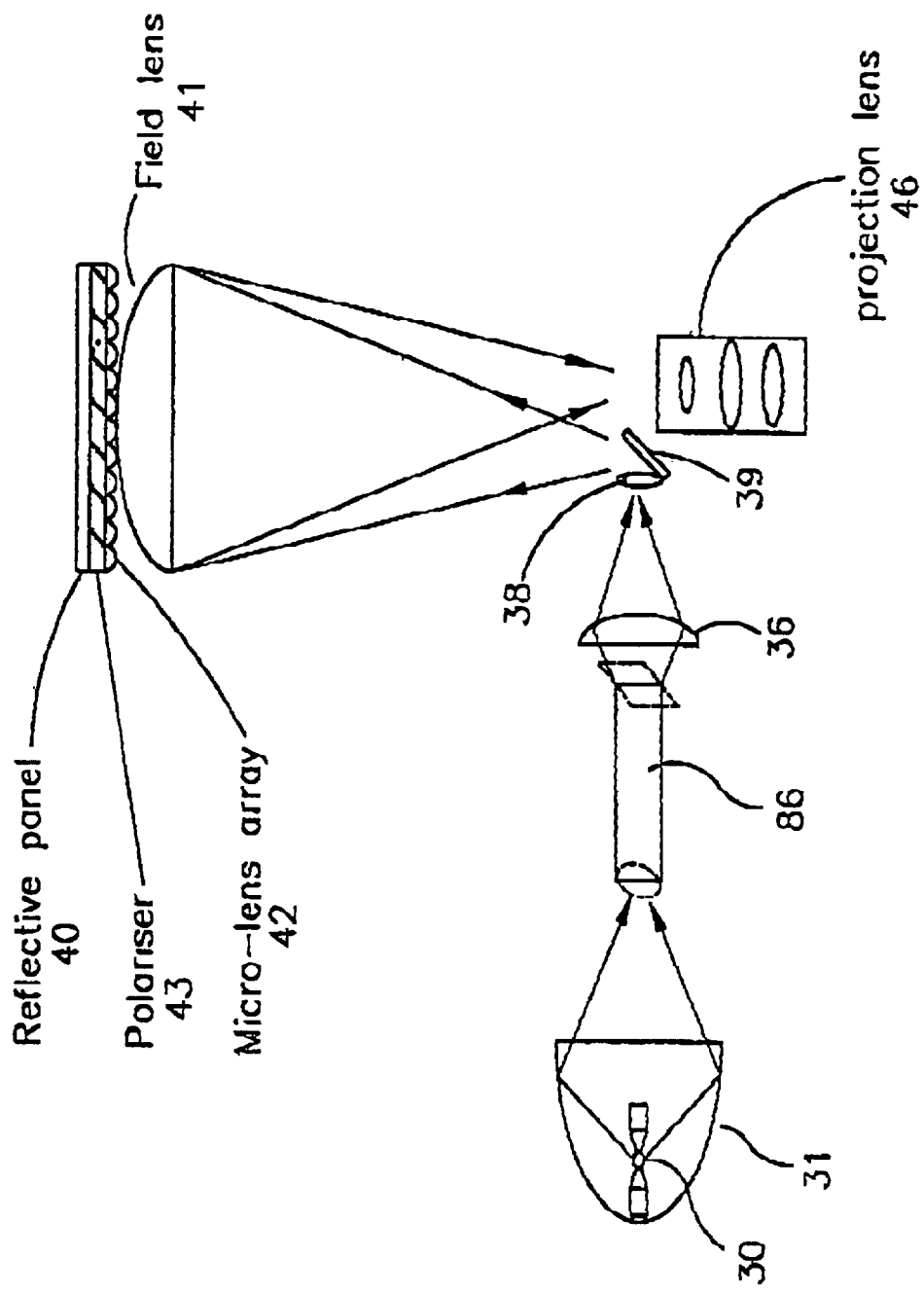
FIG. 31 is a cross-sectional diagram illustrating an alternative illumination system homogenising arrangement.

FIG. 31 illustrates a projection display which differs from that shown in FIG. 5 in that the parts 32,33 and 35 are replaced by an integrated rod 86 for homogenising the output of the light source so as to produce uniform illumination of the panel 40. The input aperture of the glass rod 86 is circular whereas the output aperture is rectangular with an aspect ratio which matches that of the panel 40.

Figure 32:
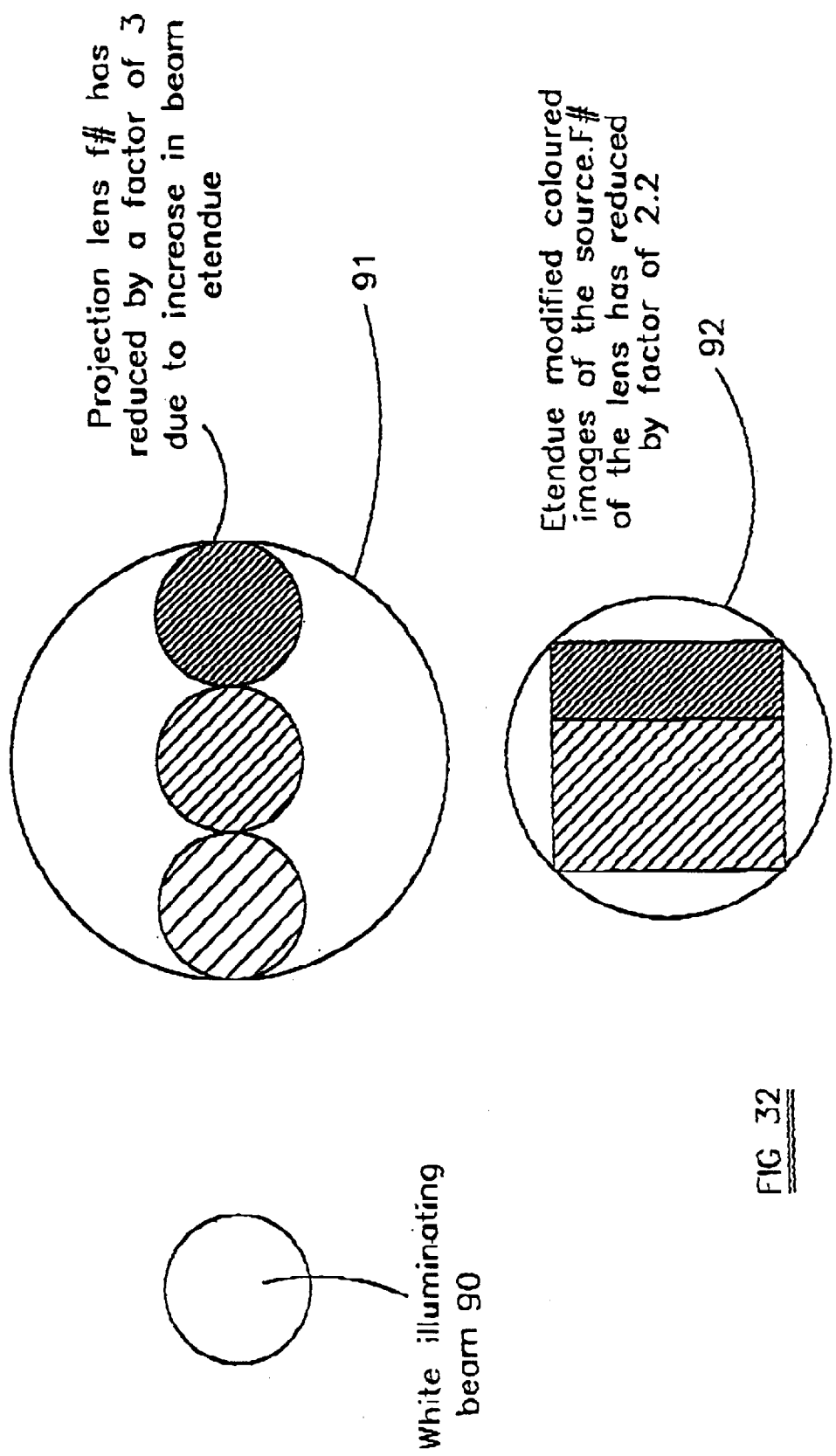
FIG. 32 is a diagram illustrating how etendue— modified colour images and illumination source allow a smaller projection lens to be used.

When dichroic mirrors are used to separate the light into three distinct colour beams, the numerical aperture of the optical system must be increased to capture the increased optical etendue of the beam to avoid degrading the system efficiency. If the shape of the source is not altered, then the f-number of the projection lens must grow by a factor of three to capture all the light. FIG. 32 illustrates the cross-sectional area of the white illuminating beam 90 and the reduction in the f number to capture the three adjacent colour component beams is illustrated at 91.

By altering the shape of the source so as to be rectangular and so that the aspect ratio of each of the colour images is 3:1, the entrance pupil of the projection lens can be more efficiently filled so that the reduction in the f number of the projection lens is reduced to approximately 2.2 as shown at 92.

Figure 33:
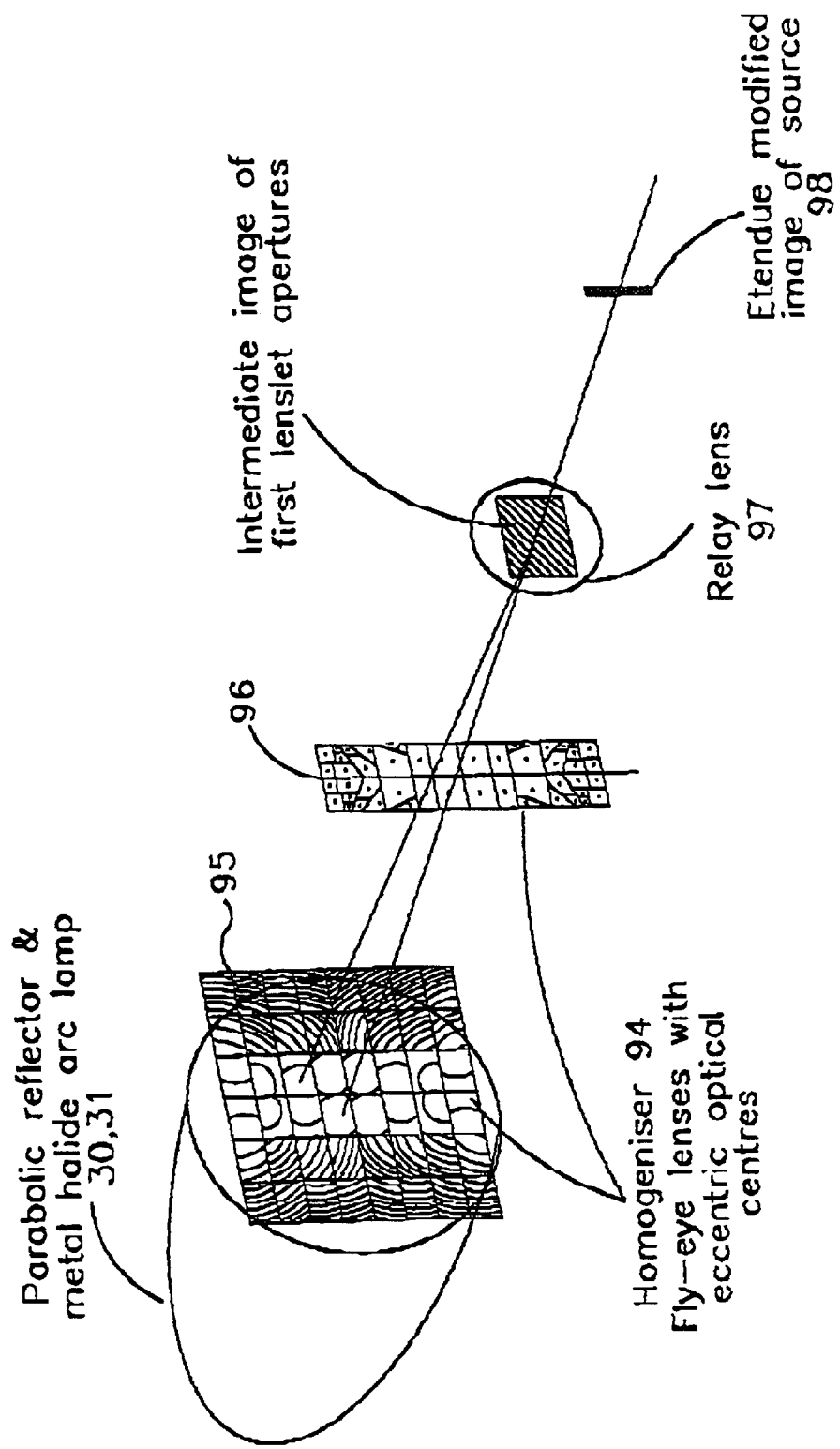
FIG. 33 is a diagram illustrating an alternative etendue—modifying light source for the projection system of FIG. 5.

Etendue modification of the illumination source may be performed as illustrated in FIG. 33. An homogeniser 84 comprises two sets of lenslet arrays 95 and 96, each comprising off-centered or eccentric optical surfaces. The first array 95 comprises apertures whose shape is substantially identical to that of the panel 40 and the optical centres create an array of closely packed images of the light emitter 30 at the plane of the second array 96. The array 96 comprises a respective lens located at each light emitter image and with an optical centre whose position is determined by drawing a straight line between the physical centre of the rectangular image of the corresponding first lenslet of the array 95 and the physical centre of the information rectangular image of the first lenslet aperture produced at a relay lens 97. The etendue modified image of the source is illustrated at 98.

Although not shown in FIG. 33, the etendue modification may be performed with the polarisation conversion in a combined arrangement.

As shown in FIG. 21, the reflectors 59 may be formed as continuous surfaces. However, reflectors of this type may require unacceptably large depth, for example resulting in excessive variations in thickness of the liquid crystal layer or in requirements for relatively deep planarisation. FIG. 22 illustrates an alternative embodiment in which the reflectors are faceted so as to limit the depth to a predetermined maximum value.

Figure 34:
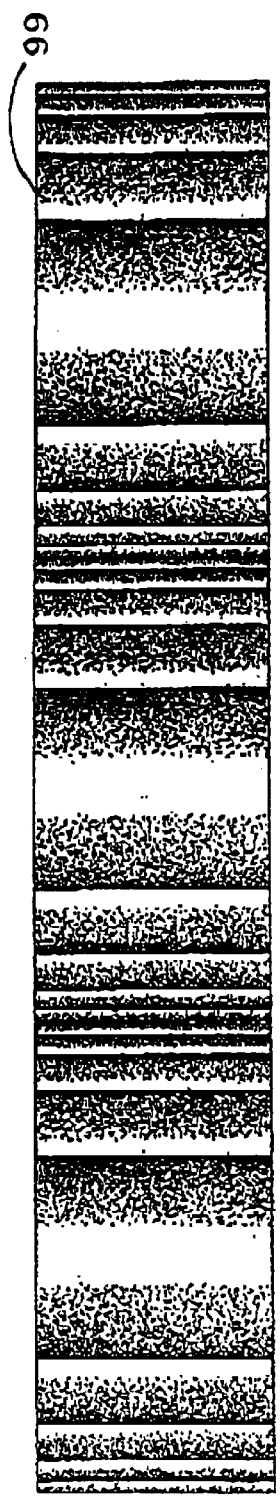
FIGS. 34 and 36 illustrate a method of making reflectors for the device of FIG. 6.
Figure 35:
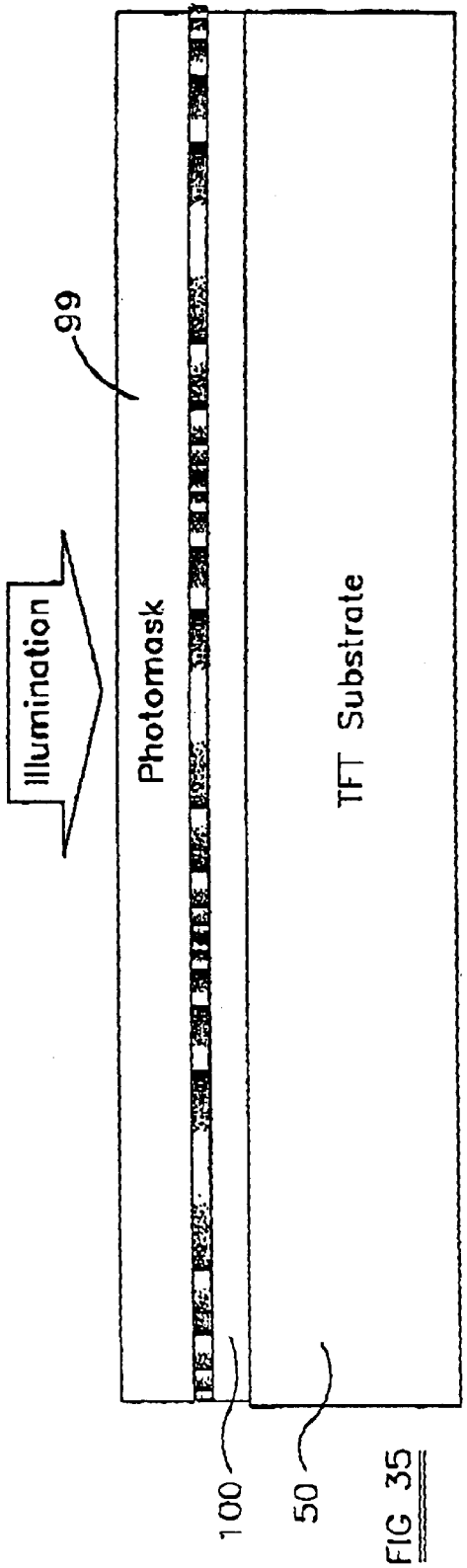
Figure 36:
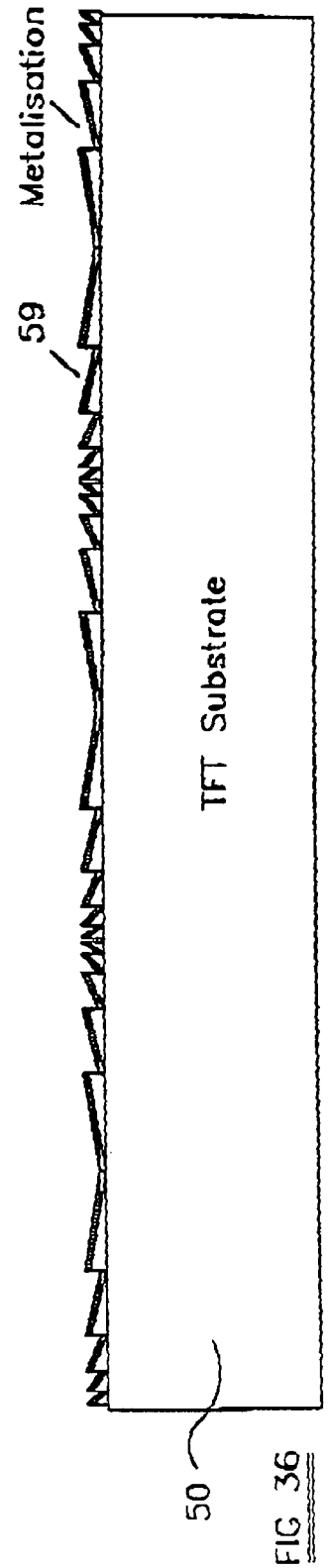

FIGS. 34 to 36 illustrate a method of making a faceted reflector of the type shown in FIG. 22. FIG. 34 illustrates a grey-scale mask 99 which, for example, is made photo-graphically in any suitable way. As shown in FIG. 35, the mask 99 is disposed over a layer 100 of a photo-resist and the optical density of the mask 99 is determined so as to adjust the exposure of the layer 100 taking into account any non-linear response of the material of the layer 100. The layer 100 is then exposed, for example to ultra violet radiation, through the mask 99. The mask 99 is then removed and the exposed layer 100 is developed so as to obtain the desired facet profile for the reflector. Finally, the profile is metallised as shown in FIG. 36 to form the reflector 59.

In order to reduce the sensitivity to process condition variations, the grey-scale mask 99 may be replaced by a binary multi-step mask or a half-tone mask. Alternatively, the required pattern of exposure may be formed directly on the layer 100 by direct writing with a laser or an electron beam.

Another technique which may be used comprises forming an inverted surface profile in a metallic shim and producing replicas by casting, embossing, or injection moulding techniques.

The reflectors 59 may alternatively comprise volume reflection holograms.

Figure 37:
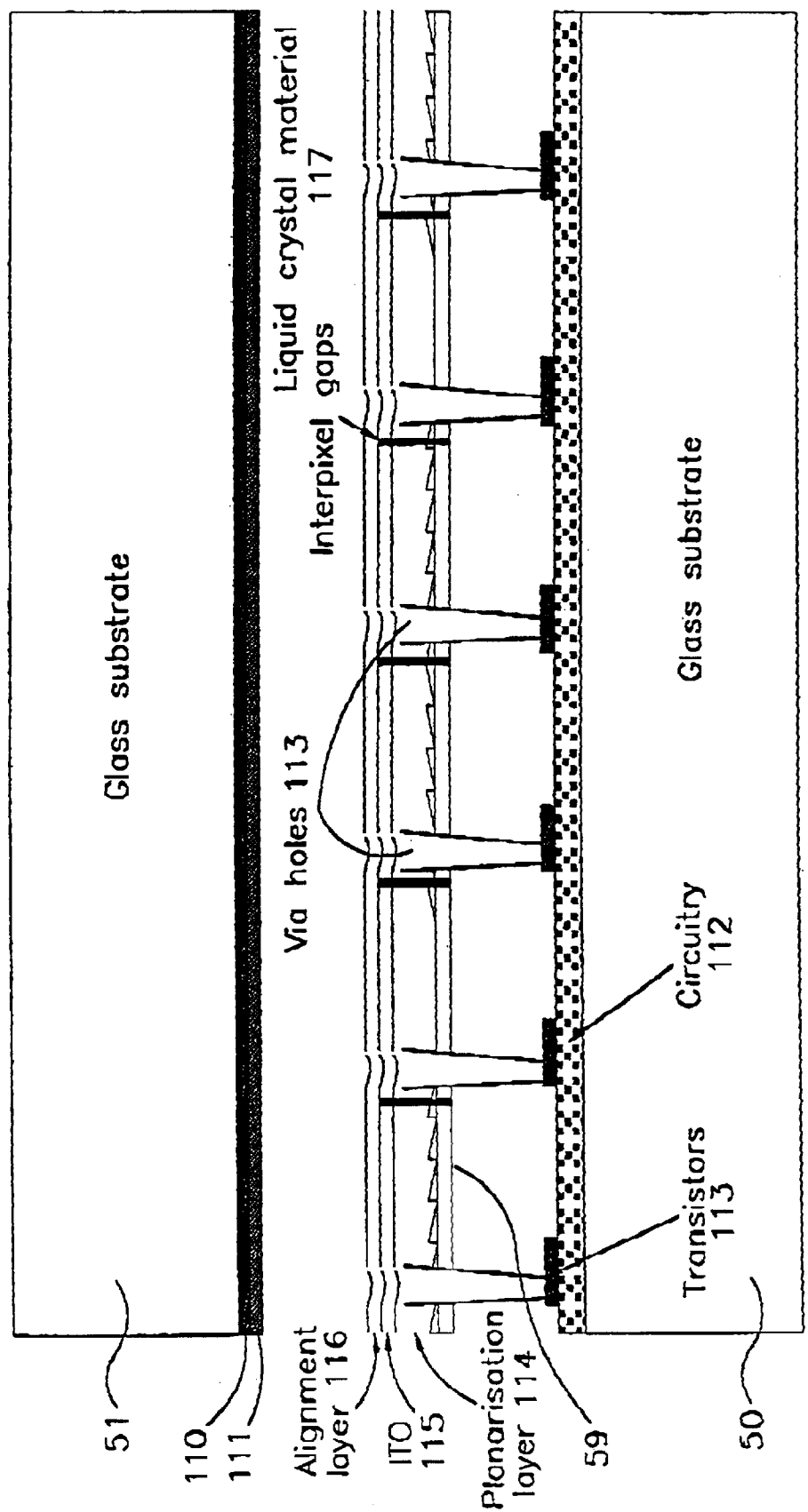
FIG. 37 is a cross-sectional diagram illustrating in more detail the structure of a device as shown in FIG. 6.

FIG. 37 illustrates in more detail a possible construction of the device 40 in the form of a thin film transistor LCD. The counter-substrate 51 is made of glass and carries on its lower surface a transparent electrode arrangement 110, for example made of indium tin oxide (ITO), and a suitable alignment layer 111 for the liquid crystal mode employed by the device.

The lower substrate 50 is also made of glass and carries on its upper surface a thin film transistor addressing arrangement or circuitry 112 including transistors such as 113. The reflectors 59 are disposed on top of the TFT circuitry 112 and via holes 113 are formed to permit the appropriate connections from the transistors 113 to electrodes. The holes are, for example, sputtered with metal so as to provide the conductive paths. A planarisation layer 114 is formed on the reflectors 59 and carries an ITO electrode arrangement 115 and an alignment layer 116. The two substrates are separated by suitable space (not shown) and the intervening cavity is filled with liquid crystal material 117.

Figure 38:
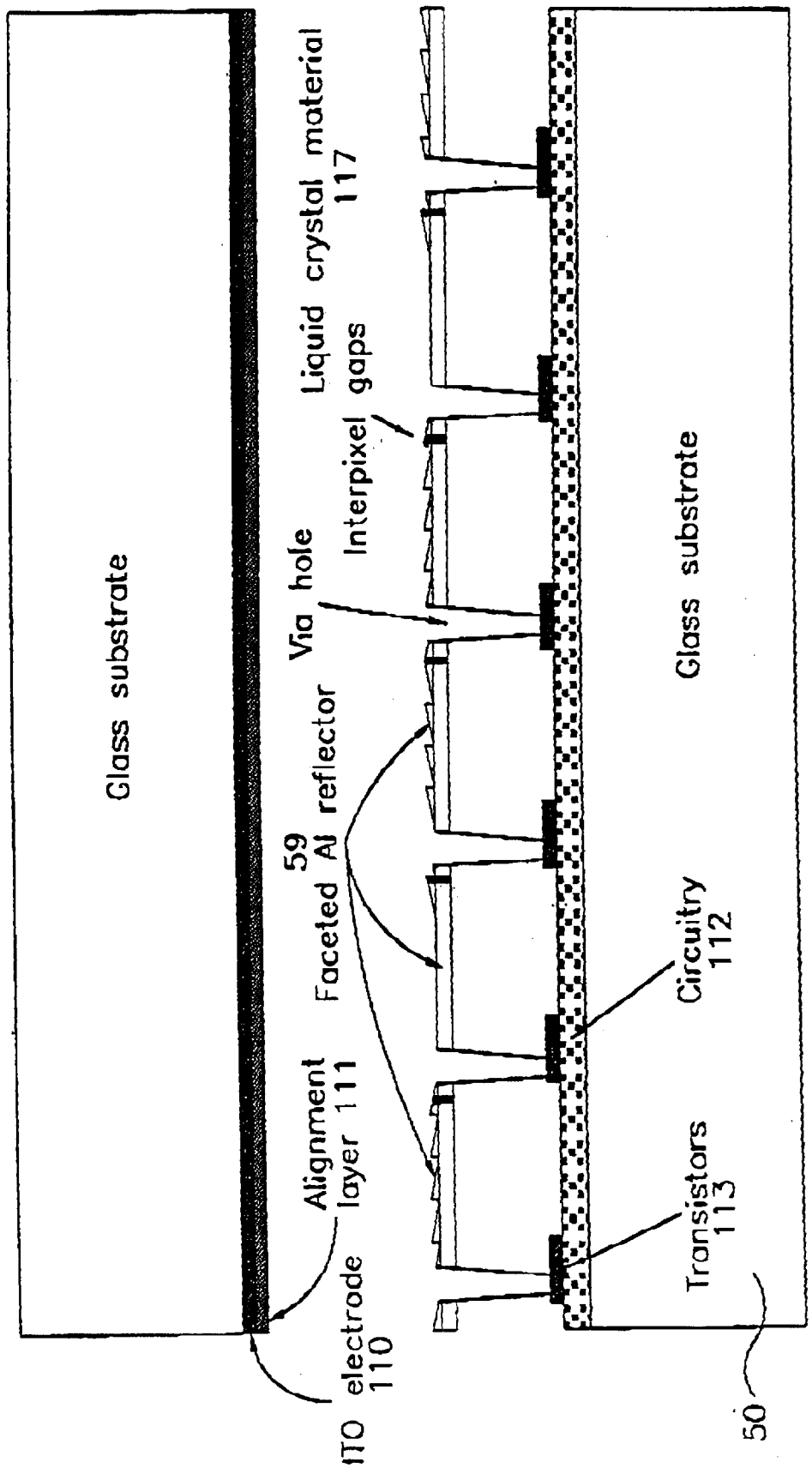
FIG. 38 is similar to FIG. 37, but illustrates a modified structure.

FIG. 38 illustrates an arrangement which differs from that shown in FIG. 37 in that planarisation of the reflectors 59 is not required. In this case, the faceted reflectors 59 are coated with aluminum and may be used as the electrodes for the liquid crystal mode. A suitable alignment layer (not shown) is disposed on the reflectors 59.

Figure 39:
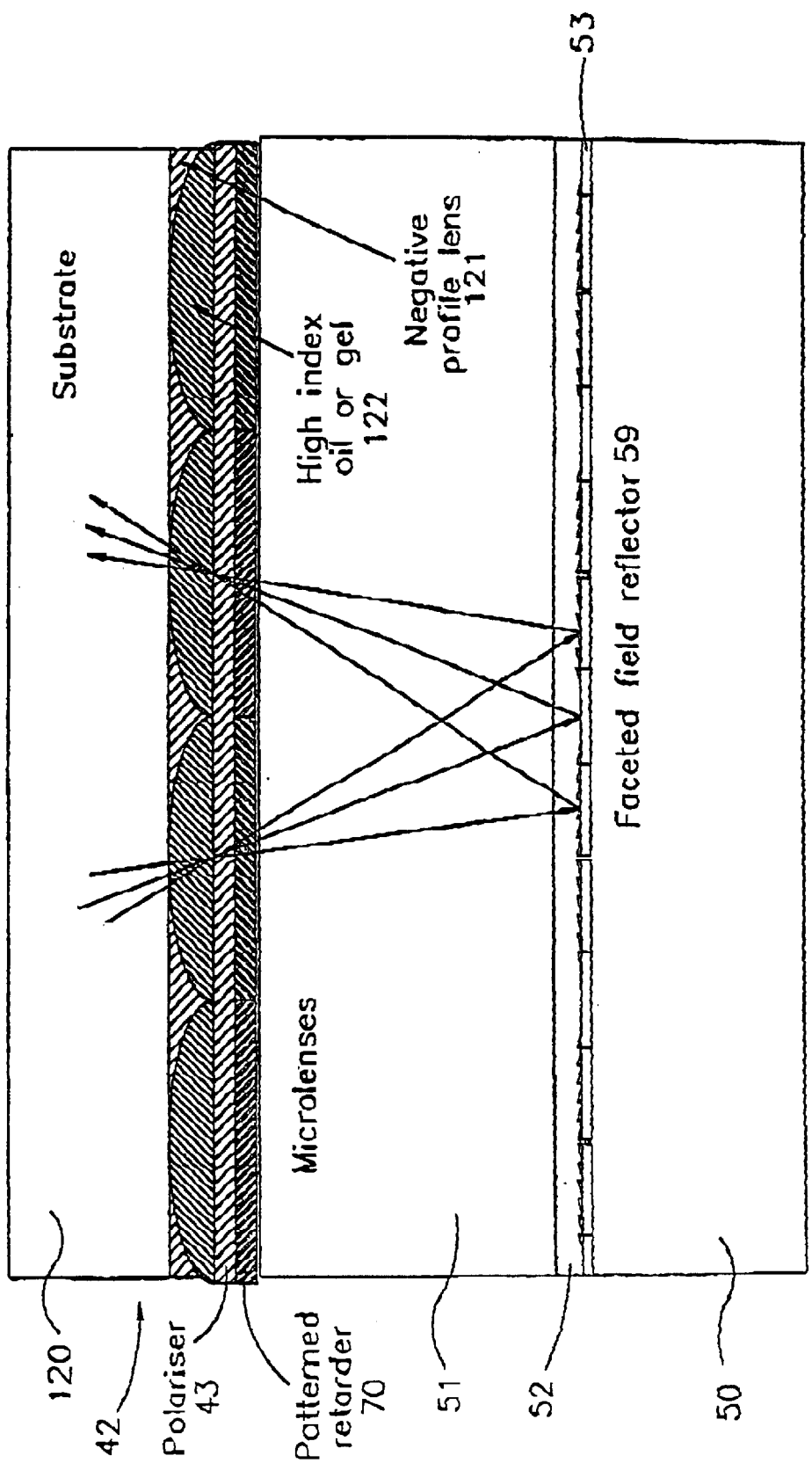
FIG. 39 is a cross-sectional diagram of a device of the type shown in FIG. 6 illustrating an arrangement of a microlens array.

The microlens array 42 may be made as an embossed acrylic or by any suitable temperature for forming surface relief lenses, such as melted photo-resist. The array 42 may alternatively comprise gradient index lenses such as Nippon Sheet Glass GRIN lenses. A further alternative is illustrated in FIG. 39. In this case, a substrate 120 has formed therein negative profile lenses 121 which contain a high refractive index transparent oil or gel 122.

Further alternatives include forming the microlenses of the array in the surface of the counter-substrate 51 or within the structure of the counter-substrate 51.

Figure 40:
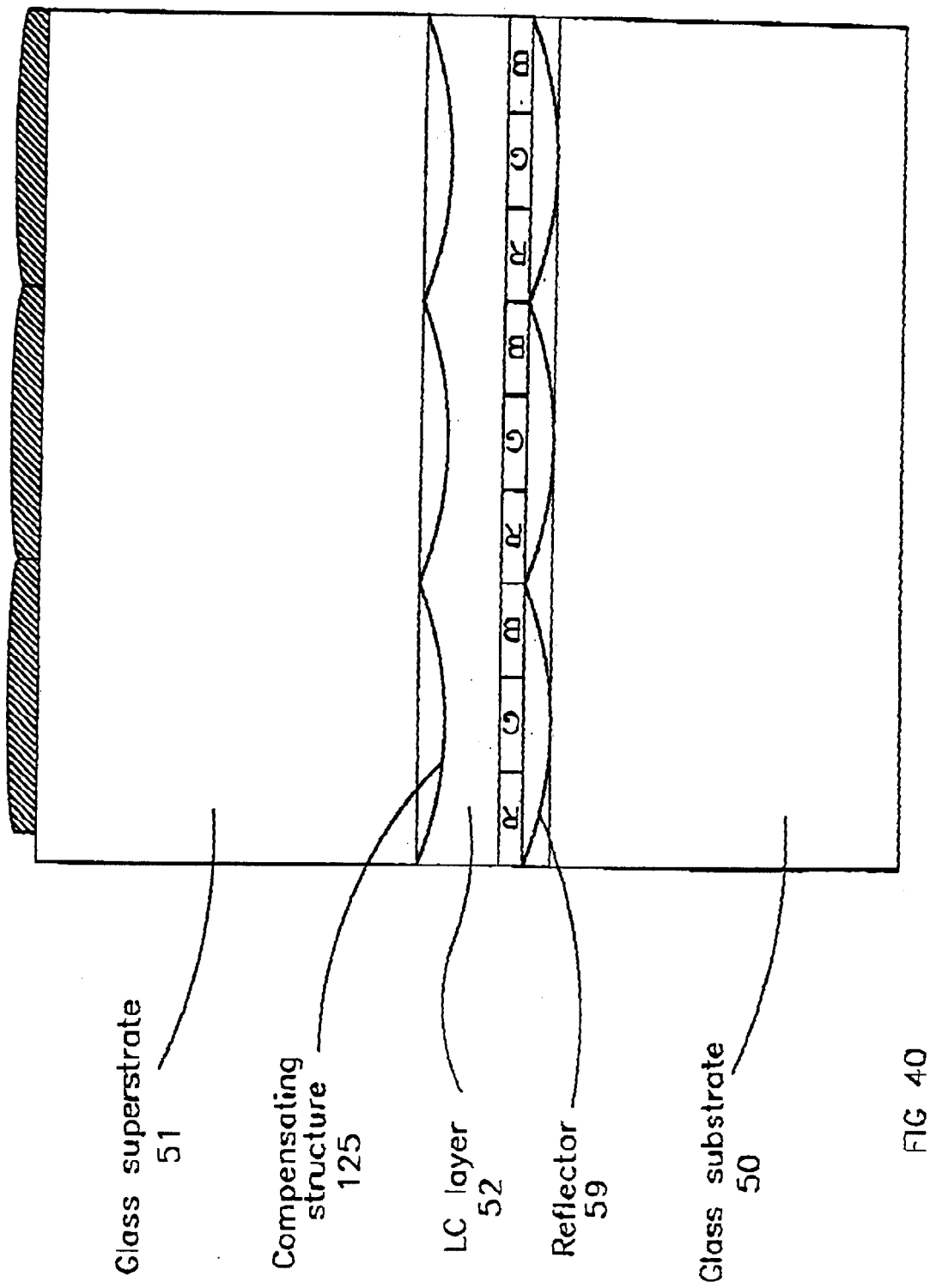
FIG. 40 is a cross-sectional diagram illustrating a device of the type shown in FIG. 6, but modified to provide uniform liquid crystal layer thickness with curved reflectors.

As mentioned hereinbefore, the use of curved surfaces for the reflectors 59 as shown in FIG. 21 may be disadvantageous because of the depth required. FIG. 40 illustrates a technique for avoiding this difficulty. In this arrangement, the superstrate 51 has formed thereon a compensating structure 125 which has the opposite profile of the reflectors 59. This arrangement allows a liquid crystal layer 52 of substantially constant thickness to be provided and so reduces or avoids undesirable effects which may occur in a liquid crystal layer of varying thickness.

What is claimed is:

1. An optical device comprising an array of convergent microlenses disposed in front of a reflective spatial light modulator comprising a plurality of rear reflectors, characterised in that each of the rear reflectors has convergent optical power.

2. A device as claimed in claim 1, characterised in that each of the reflectors is arranged to form a laterally displaced image of a microlens aperture or a part thereof substantially at the plane of the apertures of the microlenses of the array.

3. A device as claimed in claim 2, characterised in that the size of the image is substantially the same as that size of the microlens aperture or part thereof.

4. A device as claimed in claim 2, characterised in that, for a predetermined direction of incident illumination, each of the reflectors is arranged to form an image of a first microlens aperture or part thereof at or within a second microlens aperture or part thereof.

5. A device as claimed in claim 1, characterised in that each of the reflectors has a focal length substantially equal to half the optical path between an associated one of the microlenses and the reflector.

6. A device as claimed in claim 1, characterised in that each reflector has convergent optical power in a first direction transverse to an optical axis of the device and has no optical power in a second direction transverse to the optical axis of the device and substantially perpendicular to the first direction.

7. A device as claimed in claim 6, wherein for a predetermined direction of incident illumination, each of the reflectors is arranged to form an image of a first microlens aperture or part thereof at or within a second microlens aperture or part thereof, characterised in that each reflector is blazed in the second direction, and the first and second microlens apertures comprise different parts of the same microlens aperture.

8. A device as claimed in claim 1, characterised in that each reflector comprises a metallised relief structure.

9. A device as claimed in claim 8, characterised in that each reflector is faceted.

10. A device as claimed in claim 1, characterised in that each reflector comprises a volume holographic element.

11. A device as claimed in claim 1, characterised in that each of the microlenses has optical power in a third direction transverse to an optical axis of the device and no optical power in a fourth direction transverse to the optical axis of the device and substantially perpendicular to the third direction.

12. A device as claimed in claim 11, wherein each reflector has convergent optical power in a first direction transverse to an optical axis of the device and has no optical power in a second direction transverse to the optical axis of the device and substantially perpendicular to the first direction, characterised in that the third and fourth directions are substantially parallel to the first and second directions, respectively.

13. A device as claimed in claim 11, characterised in that the array of microlenses comprises a one dimensional array of cylindrically converging microlenses.

14. A device as claimed in claim 12, characterised in that the array of microlenses comprises a one dimensional array of cylindrically converging microlenses.

15. A device as claimed in claim 1, characterised in that each microlens or part thereof is associated with a respective set of the reflectors.

16. A device as claimed in claim 15, characterised in that the spatial light modulator comprises a plurality of composite picture elements, each of which is associated with a respective microlens or part thereof and comprises a plurality of sub-picture elements, each of which is associated with a respective one of the respective set of the reflectors.

17. A device as claimed in claim 15, characterised in that the reflectors of each set are different from each other and corresponding reflectors of the sets are substantially identical to each other.

18. A device as claimed in claim 1, characterised in that the spatial light modulator comprises a liquid crystal device.

19. A device as claimed in claim 18, characterised in that the reflectors are disposed between a liquid crystal layer and a substrate of the liquid crystal device.

20. A device as claimed in claim 19, characterised in that the reflectors are planarised.

21. A device as claimed in claim 19, characterised in that a further substrate of the liquid crystal device has a surface relief corresponding to the reflectors so that the liquid crystal layer has a substantially uniform thickness.

22. A projection display characterised by comprising a device as claimed in claim 1, an illumination system for illuminating the device, and projection optics for projecting an image corresponding to modulation of light from the illumination system by the spatial light modulator.

23. A display as claimed in claim 22, characterised in that the projection optics have an input pupil which is laterally spaced from an output pupil of the illumination system.

24. A display as claimed in claim 23, characterised in that the output pupil is disposed off-axis with respect to the device.

25. A display as claimed in claim 23, characterised in that the input pupil is disposed on-axis with respect to the device.

26. A display as claimed in claim 23, characterised in that the input pupil is disposed off-axis with respect to the device.

27. A display as claimed in claim 22, characterised in a field lens disposed between the illumination system and the array of microlenses.

28. A display as claimed in claim 22, characterised in that the information system comprises separating means for angularly separating red, green and blue components of light for illuminating the spatial light modulator.

29. A display as claimed in claim 28, characterised in that the separating means comprise a plurality of relatively tilted dichroic mirrors.

30. A display as claimed in claim 28, characterised in that the separating means comprises a diffraction element.

31. A display as claimed in claim 30, characterised in that the difference element comprises a blazed diffraction grating.

32. A display as claimed in claim 22, characterised in that the illumination system is arranged to illuminate the spatial light modulator with light having a first polarisation and the projection optics comprise a linear polariser for passing light from the spatial light modulator having a second polarisation substantially orthogonal to the first polarisation.

33. A display as claimed in claim 22, characterised in that the device comprises a linear polariser.

34. A display as claimed in claim 33, characterised in that the device comprises a patterned half wave retarder comprising first regions whose optic axes are parallel or perpendicular to the transmission axis of the polariser and second regions whose optic axes are oriented at 45° to the first axes.

35. A display as claimed in claim 33, characterised in that the device comprises: a patterned half wave retarder comprising first and second regions whose optic axes are oriented at +22.5° and −22.5° to the transmission axis of the polariser; and an unpatterned retarder whose optic axis is oriented at 67.5° to the transmission axis of the polariser.

36. A display as claimed in claim 22, characterised in that the illumination system comprises a linear to circular polarisation converter, the device comprises a quarter waveplate and a linear polariser, and the projection optics comprise a circular to linear polarisation converter.

37. A display as claimed in claim 36, characterised in that each of the linear to circular and circular to linear polarisation converters comprises a linear polariser and a quarter waveplate.

* * * * *